(12) United States Patent
Mueck et al.

(10) Patent No.: US 9,204,370 B2
(45) Date of Patent: Dec. 1, 2015

(54) MOBILE RADIO COMMUNICATION DEVICES AND METHODS FOR CONTROLLING A MOBILE RADIO COMMUNICATION DEVICE

(75) Inventors: Markus Mueck, Unterhaching (DE); Martin Hans, Bad Salzdetfurth (DE)

(73) Assignee: Intel Mobile Communications GmbH, Neubiberg (DE)

( * ) Notice: Subject to any disclaimer, the term of this patent is extended or adjusted under 35 U.S.C. 154(b) by 955 days.

(21) Appl. No.: 13/396,738

(22) Filed: Feb. 15, 2012

(65) Prior Publication Data
US 2012/0142293 A1   Jun. 7, 2012

Related U.S. Application Data

(63) Continuation of application No. 12/403,556, filed on Mar. 13, 2009, now Pat. No. 8,135,436.

(51) Int. Cl.
| | |
|---|---|
| *G06F 3/033* | (2013.01) |
| *G06F 17/00* | (2006.01) |
| *H04B 1/38* | (2015.01) |
| *H04W 48/12* | (2009.01) |

(52) U.S. Cl.
CPC ..................... *H04W 48/12* (2013.01)

(58) Field of Classification Search
CPC ....................................................... H04B 17/00
USPC ............................................. 455/552.1, 130
See application file for complete search history.

(56) References Cited

U.S. PATENT DOCUMENTS

| | | | |
|---|---|---|---|
| 5,682,603 A * | 10/1997 | Sano | 340/10.33 |
| 6,198,937 B1 | 3/2001 | DeClerck et al. | |
| 6,320,855 B1 | 11/2001 | Shi | |
| 6,483,814 B1 | 11/2002 | Hsu et al. | |
| 6,587,696 B1 | 7/2003 | Ma et al. | |
| 6,975,671 B2 | 12/2005 | Sindhushayana et al. | |
| 7,116,957 B2 | 10/2006 | Sih et al. | |
| 7,167,507 B2 | 1/2007 | Mailaender et al. | |

(Continued)

FOREIGN PATENT DOCUMENTS

| | | |
|---|---|---|
| CN | 1707967 A | 12/2005 |
| CN | 1943263 A | 4/2007 |

(Continued)

OTHER PUBLICATIONS

Chinese Patent Office; Fourth Office Action for Chinese App. No. 201010134996.7 mailed Aug. 13, 2014; 13 pages inclusive of English translation.

(Continued)

*Primary Examiner* — Daniel D Chang
(74) *Attorney, Agent, or Firm* — Schwabe, Williamson & Wyatt, P.C.

(57) ABSTRACT

In an embodiment, a mobile radio communication device is provided. The mobile radio communication device may include a receiver configured to receive radio pilot formation according to a radio communication technology family, and a power supply switch controller to selectively energizing and de-energizing one or more components of the mobile radio communication device based on the received radio pilot information. The radio pilot information includes availability information about the availability of at least one radio communication technology of at least one other radio communication technology family.

19 Claims, 9 Drawing Sheets

(56) References Cited

U.S. PATENT DOCUMENTS

| | | | |
|---|---|---|---|
| 7,206,554 | B1 | 4/2007 | Lindskog |
| 7,263,082 | B1 | 8/2007 | Lindskog |
| 7,342,912 | B1 | 3/2008 | Kerr et al. |
| 7,386,030 | B2 | 6/2008 | Asghar et al. |
| 7,693,536 | B2 | 4/2010 | Kogure |
| 2005/0088996 | A1 | 4/2005 | Kawamura et al. |
| 2005/0113140 | A1 | 5/2005 | Gruet et al. |
| 2005/0202818 | A1 | 9/2005 | Hondo et al. |
| 2006/0128414 | A1 | 6/2006 | Shida et al. |
| 2007/0041348 | A1 | 2/2007 | Kwun et al. |
| 2007/0147337 | A1 | 6/2007 | Bosch et al. |
| 2007/0207827 | A1 | 9/2007 | Bi et al. |
| 2007/0242732 | A1 | 10/2007 | Hsieh |
| 2007/0249361 | A1 | 10/2007 | Klang et al. |
| 2008/0051126 | A1 | 2/2008 | Nagaraj et al. |
| 2008/0207131 | A1 | 8/2008 | Coersmeier |

FOREIGN PATENT DOCUMENTS

| | | |
|---|---|---|
| CN | 1996784 A | 7/2007 |
| JP | 2007318557 A | 12/2007 |
| WO | 03056712 A1 | 7/2003 |
| WO | 2004006448 A2 | 1/2004 |
| WO | 2006099564 A1 | 9/2006 |
| WO | 2008114751 | 9/2008 |
| WO | 2008119380 A1 | 10/2008 |

OTHER PUBLICATIONS

German Patent Office; Office Action for German App. No. 102010015917.4-31 mailed Apr. 4, 2013; 2 pages.

Japanese Patent Office; Office Action for Japanese App. No. 2010-054407, mailed Dec. 18, 2012; 8 pages inclusive of English translation.

South Korean Patent Office; Office Action for South Korean App. No. 2010-0022289 mailed Feb. 28, 2012; 4 pages inclusive of English translation.

South Korean Patent Office; Office Action for South Korean App. No. 2010-0022289 mailed May 8, 2012; 4 pages inclusive of English translation.

South Korean Patent Office; Office Action for South Korean App. No. 2010-0022289 mailed Jun. 20, 2011; 7 pages inclusive of English translation.

South Korean Patent Office; Office Action for South Korean App. No. 2012-0033529 mailed Jan. 16, 2013; 4 pages inclusive of English translation.

South Korean Patent Office; Office Action for South Korean App. No. 2012-0033529 mailed Jun. 26, 2012; 2 pages English translation only.

U. Ramacher, "Software-Defined Radio Prospects for Multistandard Mobile Phones"; Computer; vol. 40, Issue 10, Oct. 2007; IEEE, Infineon Technologies AG, pp. 62-69.

S. Buljore et al.; "Introduction to IEEE P1900.4 Activities"; IEICE Transactions on Communications; vol. E91-B, No. 1, Jan. 2008; pp. 2-9.

Bourse et al., "E2R II White Paper: The E2R II Flexible Spectrum Management (FSM) Framework and Cognitive Pilot channel (CPC) Concept—Technical and Business Analysis and Recommendations"; Nov. 2007; pp. 1-52.

O. Holland et al., "Development of a Radio Enabler for Reconfiguration Management within the IEEE P1900.4 Working Group"; New Frontiers in Dynamic Spectrum Access Networks, 2007. DySPAN 2007. 2nd IEEE International Symposium on Apr. 17-20, 2007, pp. 232-239.

A. Sahai et al., "Some Fundamental Limits on Cognitive Radio"; Allerton Conference on Communication, Control, and Computing, Dept. of Electrical Engineering and Computer Science, University of California, Berkeley, 2003; pp. 1-11.

First Chinese Office Action in related application No. 2010-10134996.7, mailed Oct. 10, 2012.

Second Chinese Office Action in related application No. 2010-10134996.7, mailed Jul. 1, 2013.

Third Chinese Office Action in related application No. 2010-10134996.7, mailed Jan. 23, 2014.

First Japanese Office Action in related application No. 2013-047277, mailed Jan. 28, 2014.

Perez-Romero, J. et al.; "A Novel On-Demand Cognitive Pilot Channel enabling Dynamic Spectrum Allocation"; New Frontiers in Dynamic Spectrum Access Networks, 2007; DySPAN; 2nd IEEE International Symposium, Apr. 17, 2007; pp. 46-54; http://eeexplore.ieee.org/stamp/Jsp?tp=&arnumber=4221476.

English language abstract of JP 2007318557 A dated Dec. 6, 2007.

English language abstract of CN 1707967 A dated Dec. 14, 2005.

German Patent Office; Office Action for German App. No. 10 2010 064 541.9 mailed May 5, 2015; 11 pages inclusive of English translation.

\* cited by examiner

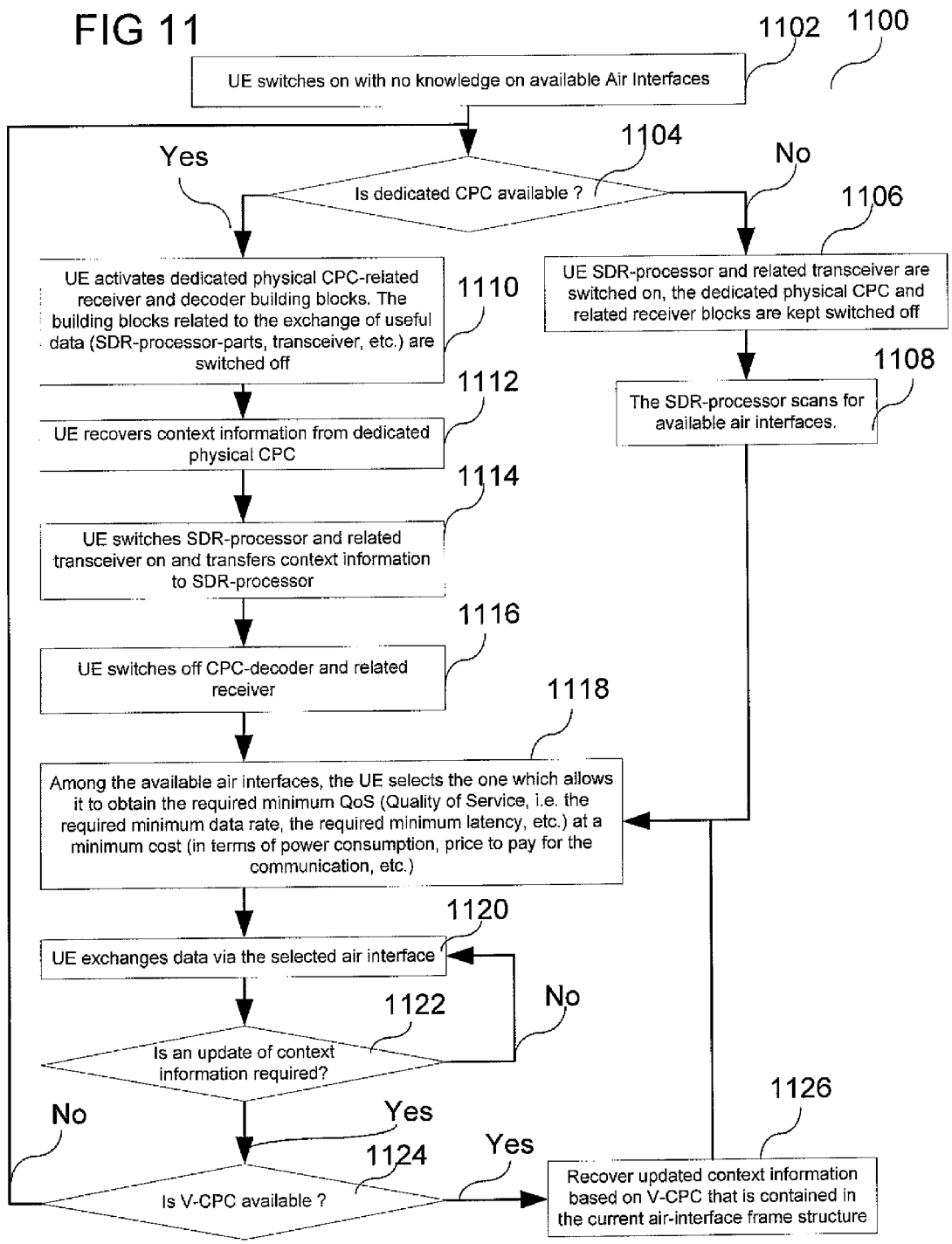

MOBILE RADIO COMMUNICATION DEVICES AND METHODS FOR CONTROLLING A MOBILE RADIO COMMUNICATION DEVICE

RELATED APPLICATIONS

The present application is a continuation application U.S. patent application Ser. No. 12/403,556 filed on Mar. 13, 2009.

TECHNICAL FIELD

Embodiments relate generally to mobile radio communication devices and methods for controlling a mobile radio communication device.

BACKGROUND

Cellular communication systems based on Cognitive Radio and Software Defined Radio paradigms are typically exploiting a standard wireless radio infrastructure as well as the presence of a Cognitive Pilot Channel (CPC) which may be sent on a specific reserved channel.

In this scenario, the Cognitive Pilot Channel (as it is under discussion within the ETSI RRS (European Telecommunications Standards Institute Reconfigurable Radio Systems) standardization group, for example), is broadcasting context information on a dedicated physical channel that helps the various user devices to know which communication standards are available (without requiring the handsets to scan for all possibilities). Typically, the user will be informed about the presence of cellular mobile radio communication systems (also referred to as Cellular Wide Area radio communication systems), metropolitan area mobile radio communication systems (also referred to as Metropolitan Area System radio communication systems) and/or short range mobile radio communication systems (also referred to as Short Range radio communication systems) and based on the context, the user device (assumed to be an SDR (Software Defined Radio) device that is reconfigurable) may choose a reconfiguration of its device.

A second type of a Cognitive Pilot Channel is the so-called Virtual Cognitive Pilot Channel (V-CPC). The V-CPC is transmitted to users via deployed Access Technologies, such as Cellular Wide Area, Metropolitan Area and/or Short Range mobile radio communication systems. In the V-CPC, no additional infrastructure needs to be deployed—however, UEs (User Equipments) need to have a first communication connection running before they can access the context information contained in the V-CPC.

Conventionally, an SDR handset device contains a reconfigurable SDR core (typically, a multitude of SIMD (Single-Instruction-Multiple-Data) processor cores assisted by accelerators, such as Maximum-Likelihood decoders, filters, etc.). In some conventional implementations, a reconfigurable transceiver is present.

In such an architecture, a handset device is usually not exploiting a (potentially available) Cognitive Pilot Channel. Rather, a handset device usually scans all available frequency bands and checks for the presence of all possible system configurations. In a standard scenario it is assumed that frequency allocations for the various radio communication systems are fixed. Still, the scanning of all possibilities typically takes a considerable amount of time and consumes large amounts of battery power.

In the future, it is expected that frequency allocations are no longer fixed for distinct radio communication systems and the number of possibilities to be considered during the scanning processing increases considerably, since the number of degrees of freedom rises. In such a context, the scanning of all possible permutations is becoming quasi impossible.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 11 shows a flow diagram illustrating a method for controlling a mobile radio communication device in accordance with an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

Figure 1:
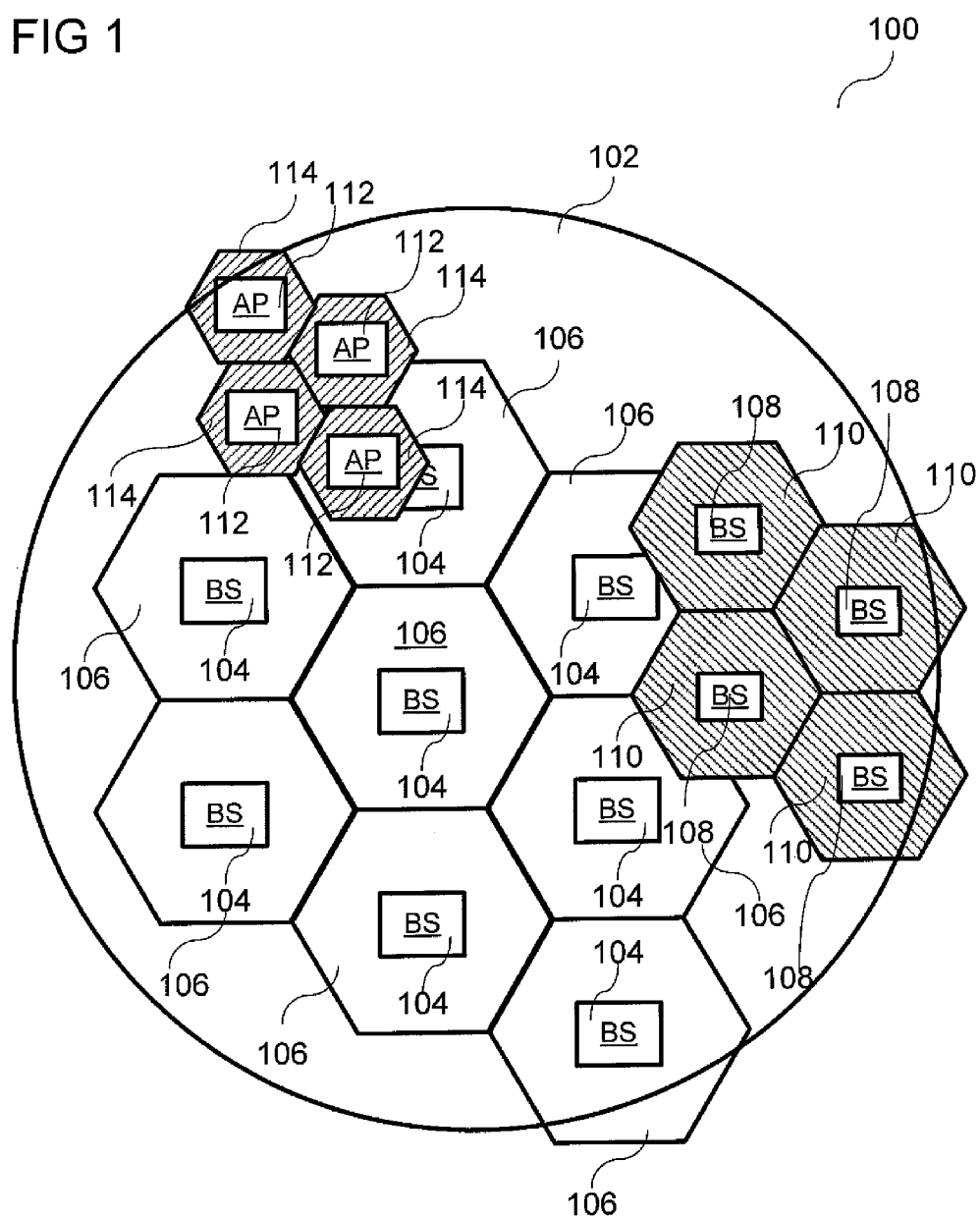
FIG. 1 shows a radio communication system in accordance with an embodiment.

FIG. 1 shows a radio communication system 100 in accordance with an embodiment. Illustratively, FIG. 1 shows a heterogeneous Wireless Radio Environment including a Cognitive Pilot Channel.

In various embodiments, cellular radio communication systems based on Cognitive Radio and Software Defined Radio paradigms, are exploiting a standard wireless radio infrastructure as well as the presence of a Cognitive Pilot Channel (CPC) which may be sent on a specific reserved channel. This is illustrated in FIG. 1, which shows a coverage region 102, in which one or more Cognitive Pilot Channel (CPC) signals exist and can be received by a radio communication terminal device (not shown) which is located within this coverage region 102. Although the coverage region 102 is shown as a circular region in FIG. 1, it should be noted that the coverage region 102 may have an arbitrary shape and was only shown as circular for reasons of simplicity.

In various embodiments, it is assumed that a plurality of different radio communication technologies of the a plurality of different radio communication technology families are provided which provide radio communication services within the coverage region 102. It is to be noted that in alternative embodiments, some of the radio communication technologies may be provided outside the coverage region 102. By way of example, as shown in FIG. 1, different radio communication technologies of three different radio communication technology families are provided.

Examples of various radio communication technology families are groups of one or more radio communication technologies which may be grouped according to one or more respective radio characteristics such as e.g. the range of the radio services provided by the respective one or more radio communication technologies or the way the radio signals are encoded and/or transmitted (e.g. via the air interface).

By way of example, radio communication technology families may be:
- a Short Range radio communication technology family (which may include e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput),
- a Metropolitan Area System radio communication technology family (which may include e.g. a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface,
- a Cellular Wide Area radio communication technology family (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

The Short Range radio communication technology family may be divided into the following Short Range radio communication technology sub-families:
- a personal area networks (Wireless PANs) radio communication sub-family, which may include e.g. IrDA (Infrared Data Association), Bluetooth, UWB, Z-Wave and ZigBee; and
- a wireless local area networks (W-LANs) radio communication sub-family, which may include e.g. HiperLAN/2 (HIgh PErformance Radio LAN; an alternative ATM-like 5 GHz standardized technology), IEEE 802.11a (5

GHz), IEEE 802.11g (2.4 GHz), IEEE 802.11n, IEEE 802.11 VHT (VHT=Very High Throughput).

The Metropolitan Area System radio communication technology family may be divided into the following Metropolitan Area System radio communication technology sub-families:
- a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and
- a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

Furthermore, in various embodiments, examples of different radio communication technology families may be:
- at least one radio communication technology family which includes a radio communication technology in which the access to radio resources is provided in a random manner (which may include e.g. a Bluetooth radio communication technology, IrDA (Infrared Data Association) radio communication technology, Z-Wave radio communication technology, ZigBee radio communication technology, an Ultra Wide Band (UWB) radio communication technology, and/or a Wireless Local Area Network radio communication technology (e.g. according to an IEEE 802.11 radio communication standard, a HiperLAN/2 (HIgh PErformance Radio LAN; an alternative ATM-like 5 GHz standardized technology) radio communication standard, an IEEE 802.11a (5 GHz) radio communication standard, an IEEE 802.11g (2.4 GHz) radio communication standard, an IEEE 802.11n radio communication standard, an IEEE 802.11 VHT (VHT=Very High Throughput) radio communication standard); and/or
- at least one radio communication technology family which includes a radio communication technology in which the access to radio resources is provided in a centrally controlled manner (which may include e.g. a Worldwide Interoperability for Microwave Access (WiMax) (e.g. according to an IEEE 802.16 radio communication standard, e.g. WiMax fixed or WiMax mobile), and/or WiPro, HiperMAN (High Performance Radio Metropolitan Area Network), IEEE 802.16m Advanced Air Interface, and/or a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced))), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

As shown in FIG. 1, a radio communication technology of a first radio communication technology family (e.g. of a Cellular Wide Area radio communication technology family), e.g. UMTS is provided within the coverage region 102 by means of a plurality of UMTS base stations (also referred to as NodeBs in the following) 104, wherein each base station 104 spans a UMTS mobile radio cell 106, in which radio signals may be received transmitted from the respective UMTS base station 104. Furthermore, a radio communication technology of a second radio communication technology family (e.g. of a Metropolitan Area System radio communication technology family), e.g. IEEE 802.16e (e.g. WiMax) or IEEE 802.16m Advanced Air Interface is provided within the coverage region 102 by means of a plurality of WiMax base stations 108, wherein each WiMax base station 108 spans a WiMax mobile radio cell 110, in which radio signals may be received transmitted from the respective WiMax base station 108. Moreover, a radio communication technology of a third radio communication technology family (e.g. of a Short Range radio communication technology family), e.g. WLAN is provided within the coverage region 102 by means of a plurality of WLAN access points 112, wherein each WLAN access point 112 spans a WLAN mobile radio cell 114, in which radio signals may be received transmitted from the respective WLAN access point 112.

In various embodiments, one or more mobile radio communication terminal devices (not shown in FIG. 1) may be located within the coverage region 102 and may receive the cognitive pilot channel signal, which in this example may include the information about which radio communication technology/technologies of which radio communication technology family/families is/are currently available, as will be described in more detail below.

It is to be noted that in various embodiments, a plurality of different radio communication technologies of the same radio communication technology family may be provided in the coverage region 102.

Furthermore, the various available radio communication technologies (of the same or of different radio communication technology families) may simultaneously be provided, in other words, the covering regions of a plurality radio communication technologies may overlap within the coverage region 102, which means that a plurality of different radio communication technologies may be available for a mobile radio communication terminal device at the same time so that the mobile radio communication terminal device may select one or more of the available radio communication technologies to be actually used for transmitting and receiving e.g. useful data.

Figure 2:
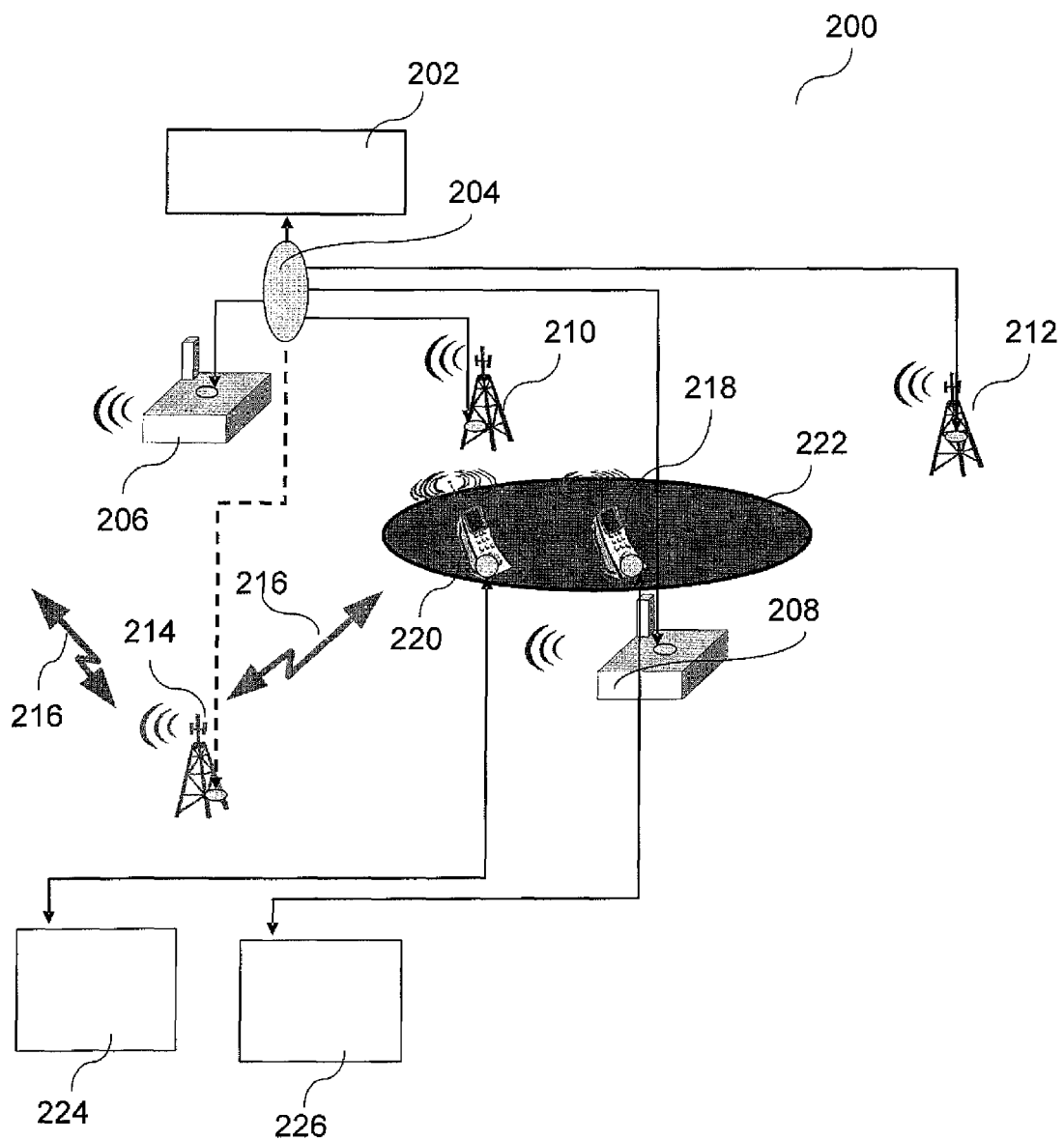
FIG. 2 shows a portion of a radio communication system in accordance with an embodiment.

FIG. 2 shows a portion 200 of a radio communication system in accordance with an embodiment.

As shown in FIG. 2, and in accordance with the definition of a CPC or a Virtual CPC (V-CPC) which has been provided within the IEEE SCC 41/IEEE P1900.4 Standardization group, a "Radio Enabler (RE) of Reconfiguration Management" may be provided in order to distribute context information to UEs, as will be described in more detail below. As shown in FIG. 2, a Network Reconfiguration Manager (NRM) device 202 is provided as an entity on the network side, e.g. as an entity within the Core Network. The Network Reconfiguration Manager (NRM) device 202 is coupled to a plurality of different radio communication technologies of various radio communication technology families via a network structure 204. By way of example, the network structure 204 may be coupled to a first access point 206 according to an IEEE 802.11n radio communication standard as an example of a radio communication technology of a Short Range radio communication technology family and to a second access point 208 according to an IEEE 802.11n radio communication standard. Furthermore, the network structure 204 may be coupled to a WiMax access point 210 as an example of a radio communication technology of a Metropolitan Area System radio communication technology family. Moreover, the network structure 204 may be coupled to a first UMTS NodeB 212 as an example of a radio communication technology of a Cellular Wide Area radio communication technology family and to a second UMTS NodeB 214, which may be additionally or alternatively configured to transmit, e.g. broadcast, a CPC signal or a V-CPC signal (in FIG. 2 symbolized by means of a double arrow 216). In an alternative embodiment, the second UMTS NodeB 214 may be replaced by any other base station device configured to transmit, e.g. broadcast, a CPC signal or a V-CPC signal. In general, an arbitrary number of access points or base stations of different radio communication technologies of various radio communication technology families may be provided in alternative embodiments.

In an embodiment, it is assumed that a plurality of radio communication terminal devices 218, 220 are provided which are configured to receive and decode a CPC signal or a V-CPC signal, as will be described in more detail below. Furthermore, it is assumed that the radio communication terminal devices 218, 220 are located in a coverage region 222 so that they can receive the transmitted CPC signal or V-CPC signal as shown in FIG. 2. In this example, it is further assumed that the radio communication terminal devices 218, 220 are located in a coverage region of the WiMax access point 210 so that they can receive the WiMax signals transmitted by the WiMax access point 210.

As will be described in more detail below, in various embodiments, the described architecture may be enriched by integrating a Cognitive Pilot Channel reception module and a corresponding logic that exploits the inherent information (provided in the transmitted CPC signal or V-CPC signal) in the radio communication terminal devices 218, 220.

As will be described in more detail below, the radio communication terminal devices 218, 220 each may include a terminal reconfiguration manager (TRM) circuit 224, 226, which are components of the so-called Radio Enabler of Reconfiguration Management in accordance with IEEE SCC 41/IEEE P1900.4. The TRM takes the context information and the policy information provided by the CPC and takes reconfiguration decisions on its own exploiting the knowledge from the received context information (plus additional sensing results if available) subject to the policies (which are typically limiting the available choices).

In various embodiments, the Cognitive Pilot Channel (as it is under discussion within the ETSI RRS standardization group, for example), is broadcasting context information on a dedicated physical channel that helps the various user devices (e.g. the radio communication terminal devices 218,220) to know which radio communication standards are available (without requiring the handsets (e.g. the radio communication terminal devices 218,220) to scan for all possibilities) and to choose a configuration of the radio communication terminal devices that fits best the user's needs. Typically, the user (and e.g. the respective radio communication terminal device) will be informed about the presence of cellular mobile radio communication systems (also referred to as Cellular Wide Area radio communication systems), metropolitan area mobile radio communication systems (also referred to as Metropolitan Area System radio communication systems) and/or short range mobile radio communication systems (also referred to as Short Range radio communication systems) and based on the context the user device (assumed to be an SDR (Software Defined Radio) device that is reconfigurable) may choose a reconfiguration of its device. The choice may depend on constraints that are imposed by certain policies, e.g. policies of the service providers, policies of the user terminal or policies of user preferences.

A second type of a Cognitive Pilot Channel which may be provided in various embodiments is the so-called Virtual Cognitive Pilot Channel (V-CPC). The V-CPC is transmitted to users via deployed Radio Access Technologies, such as Cellular Wide Area, Metropolitan Area and/or Short Range mobile radio communication systems. In the V-CPC, no additional infrastructure needs to be deployed—however, UEs (User Equipments) need to have a first communication connection running before they can access the context information contained in the V-CPC.

Various embodiments deal with the question on how to do the integration of CPC/V-CPC related building blocks into an SDR handset implementation.

Figure 3:
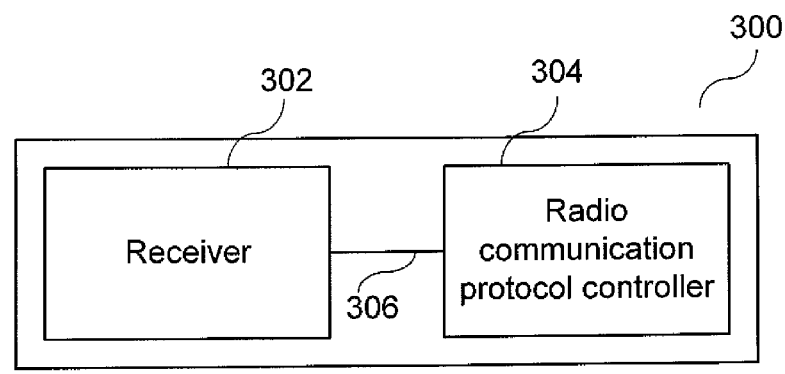
FIG. 3 shows a radio communication device in accordance with an embodiment.

FIG. 3 shows a mobile radio communication device 300 (e.g. an implementation of the radio communication terminal devices 218, 220) in accordance with an embodiment.

In various embodiments, the mobile radio communication device 300 may include a receiver 302 configured to receive radio pilot information via a predefined physical radio channel according to a radio communication technology family, wherein the radio pilot information may include availability information about the availability of at least one radio communication technology of at least one other radio communication technology family. The mobile radio communication device 300 may further include a radio communication protocol controller 304 configured to provide at least one radio communication protocol of the at least one radio communication technology of the at least one other radio communication technology family based on the received pilot information. The receiver 302 and the radio communication protocol controller 304 may be coupled with each other, e.g. via an electrical connection 306 such as e.g. a cable or a computer bus or via any other suitable electrical connection to exchange electrical signals.

In an implementation of this embodiment, the radio communication protocol controller 304 may include or be formed by a programmable controller, e.g. a microprocessor (e.g. a Complex Instruction Set Computer (CISC) microprocessor or a Reduced Instruction Set Computer (RISC) microprocessor).

Figure 4:
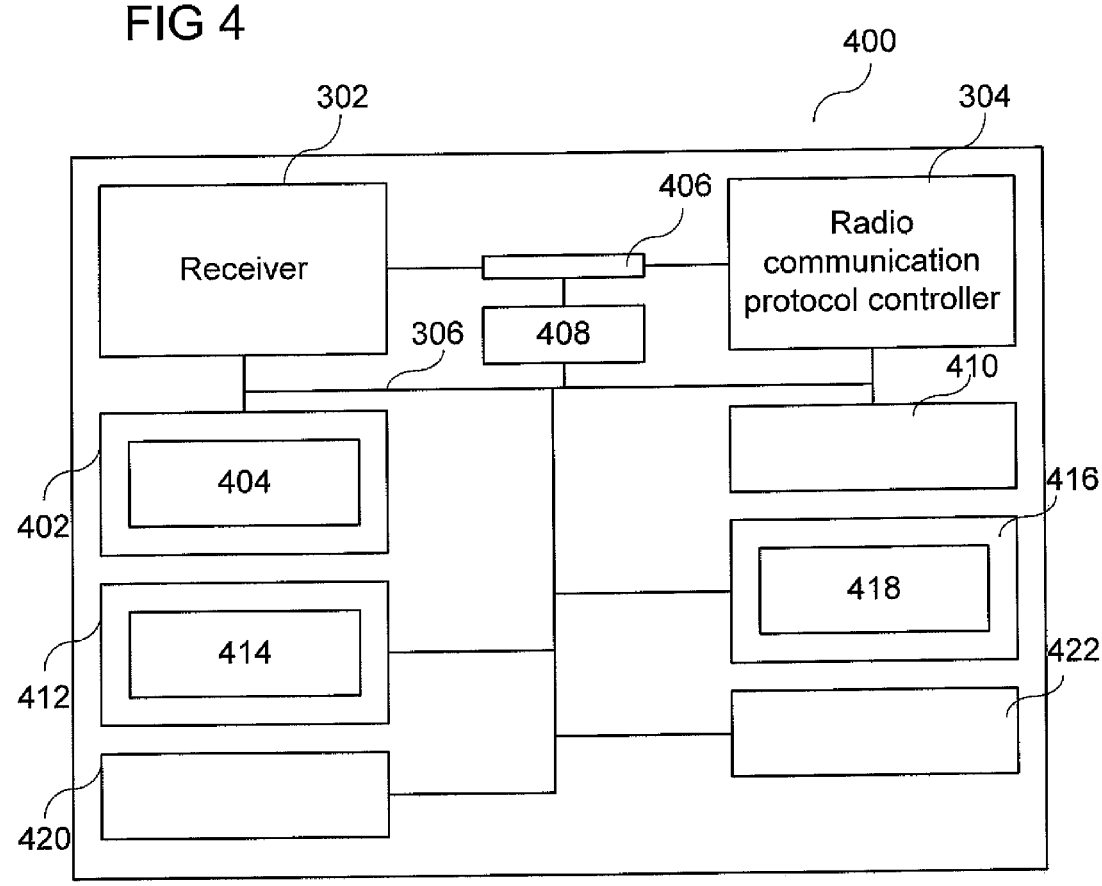
FIG. 4 shows a radio communication device in accordance with another embodiment.

FIG. 4 shows a radio communication device 400 in accordance with another embodiment. In this embodiment, the radio communication device 400 of FIG. 4 may include, in addition to the radio communication device 300 of FIG. 3, a decoder 402 configured to decode the received pilot information (e.g. received via the receiver 302). The decoder 402 may include at least one radio baseband circuit 404 configured to decode the received pilot information. The decoder 402 may be implemented on the same chip (e.g. in the same processor, e.g. in the same microprocessor) as the radio communication protocol controller 304, or on a separate chip. The at least one radio baseband circuit 404 may include at least one radio baseband circuit being configured to provide one or more of the following baseband functions: demodulation of the received physical channel signal and/or extraction of the pilot information from the received physical channel signal.

In various embodiments, the predefined physical channel may be a Cognitive Pilot Channel. In alternative embodiments, the predefined physical channel may be a non-cognitive physical channel, wherein the pilot information may be received via a Virtual Cognitive Pilot Channel (which may be decoded in higher radio communication layers such as e.g. a network communication layer or an application communication layer).

The at least one radio communication technology family may include one or more of the following radio communication technology families:
  a Short Range radio communication technology family;
  a Metropolitan Area System radio communication technology family; and
  a Cellular Wide Area radio communication technology family.

In various embodiments, the Short Range radio communication technology family may include at least one of the following radio communication technologies:
  a Bluetooth radio communication technology;
  an Ultra Wide Band (UWB) radio communication technology;
  a Wireless Local Area Network radio communication technology (e.g. according to an IEEE 802.11 (e.g. IEEE 802.11n) radio communication standard);
  IrDA (Infrared Data Association);
  Z-Wave;
  ZigBee;
  HiperLAN/2 (HIgh PErformance Radio LAN; an alternative ATM-like 5 GHz standardized technology),
  IEEE 802.11a (5 GHz);
  IEEE 802.11g (2.4 GHz); and
  IEEE 802.11 VHT (VHT=Very High Throughput).

Furthermore, the Short Range radio communication technology family may be divided into the following Short Range radio communication technology sub-families:
  a personal area networks (Wireless PANs) radio communication sub-family, which may include e.g. IrDA (Infrared Data Association), Bluetooth, UWB, Z-Wave and ZigBee; and
  a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:
  a Worldwide Interoperability for Microwave Access (WiMax) (e.g. according to an IEEE 802.16 radio communication standard, e.g. WiMax fixed radio communication standard or WiMax mobile radio communication standard);
WiPro;
HiperMAN (High Performance Radio Metropolitan Area Network); and
IEEE 802.16m Advanced Air Interface Furthermore, the Metropolitan Area System radio communication technology family may be divided into the following Metropolitan Area System radio communication technology sub-families:

a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:

a Global System for Mobile Communications (GSM) radio communication technology;
a General Packet Radio Service (GPRS) radio communication technology;
an Enhanced Data Rates for GSM Evolution (EDGE) radio communication technology; and
a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));
CDMA2000 (Code division multiple access 2000);
CDPD (Cellular Digital Packet Data);
Mobitex;
3G (Third Generation);
CSD (Circuit Switched Data);
HSCSD (High-Speed Circuit-Switched Data);
UMTS (3G) (Universal Mobile Telecommunications System (Third Generation));
W-CDMA (UMTS) (Wideband Code Division Multiple Access (Universal Mobile Telecommunications System));
HSPA (High Speed Packet Access);
HSDPA (High-Speed Downlink Packet Access);
HSUPA (High-Speed Uplink Packet Access);
HSPA+ (High Speed Packet Access Plus);
UMTS-TDD (Universal Mobile Telecommunications System—Time-Division Duplex);
TD-CDMA (Time Division—Code Division Multiple Access);
TD-CDMA (Time Division—Synchronous Code Division Multiple Access);
3GPP Rel. 8 (Pre-4G) (3rd Generation Partnership Project Release 8 (Pre-4th Generation));
UTRA (UMTS Terrestrial Radio Access);
E-UTRA (Evolved UMTS Terrestrial Radio Access);
LTE Advanced (4G) (Long Term Evolution Advanced (4th Generation));
cdmaOne (2G);
CDMA2000 (3G);
EV-DO (Evolution-Data Optimized or Evolution-Data Only);
AMPS (1G) (Advanced Mobile Phone System (1st Generation));
TACS/ETACS (Total Access Communication System/Extended Total Access Communication System);
D-AMPS (2G) (Digital AMPS (2nd Generation));
PTT (Push-to-talk);
MTS (Mobile Telephone System);
IMTS (Improved Mobile Telephone System);
AMTS (Advanced Mobile Telephone System);
OLT (Norwegian for Offentlig Landmobil Telefoni, Public Land Mobile Telephony);
MTD (Swedish abbreviation for Mobiltelefonisystem D, or Mobile telephony system D);
Autotel/PALM (Public Automated Land Mobile);
ARP (Finnish for Autoradiopuhelin, "car radio phone");
NMT (Nordic Mobile Telephony);
Hicap (High capacity version of NTT (Nippon Telegraph and Telephone));
CDPD (Cellular Digital Packet Data);
DataTAC;
iDEN (Integrated Digital Enhanced Network);
PDC (Personal Digital Cellular);
PHS (Personal Handy-phone System);
WiDEN (Wideband Integrated Digital Enhanced Network);
iBurst;
Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

In various embodiments, the at least one other radio communication technology family may include one or more of the following radio communication technology families:
- a Short Range radio communication technology family;
- a Metropolitan Area System radio communication technology family; and
- a Cellular Wide Area radio communication technology family.

In various embodiments, the Short Range radio communication technology family may include at least one of the following radio communication technologies:
- a Bluetooth radio communication technology;
- an Ultra Wide Band (UWB) radio communication technology;
- a Wireless Local Area Network radio communication technology (e.g. according to an IEEE 802.11 (e.g. IEEE 802.11n) radio communication standard);
- IrDA (Infrared Data Association);
- Z-Wave;
- ZigBee;
- HiperLAN/2 (HIgh PErformance Radio LAN; an alternative ATM-like 5 GHz standardized technology);
- IEEE 802.11a (5 GHz);
- IEEE 802.11g (2.4 GHz); and
- IEEE 802.11 VHT (VHT=Very High Throughput).

Furthermore, the Short Range radio communication technology family may be divided into the following Short Range radio communication technology sub-families:
- a personal area networks (Wireless PANs) radio communication sub-family, which may include e.g. IrDA (Infrared Data Association), Bluetooth, UWB, Z-Wave and ZigBee; and
- a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:
- a Worldwide Interoperability for Microwave Access (WiMax) (e.g. according to an IEEE 802.16 radio communication standard, e.g. WiMax fixed radio communication standard or WiMax mobile radio communication standard);
- WiPro;
- HiperMAN (High Performance Radio Metropolitan Area Network); and
- IEEE 802.16m Advanced Air Interface.

Furthermore, the Metropolitan Area System radio communication technology family may be divided into the following Metropolitan Area System radio communication technology sub-families:
- a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and
- a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:
- a Global System for Mobile Communications (GSM) radio communication technology;
- a General Packet Radio Service (GPRS) radio communication technology;
- an Enhanced Data Rates for GSM Evolution (EDGE) radio communication technology; and
- a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));
- CDMA2000 (Code division multiple access 2000);
- CDPD (Cellular Digital Packet Data);
- Mobitex;
- 3G (Third Generation);
- CSD (Circuit Switched Data);
- HSCSD (High-Speed Circuit-Switched Data);
- UMTS (3G) (Universal Mobile Telecommunications System (Third Generation));
- W-CDMA (UMTS) (Wideband Code Division Multiple Access (Universal Mobile Telecommunications System));
- HSPA (High Speed Packet Access);
- HSDPA (High-Speed Downlink Packet Access);
- HSUPA (High-Speed Uplink Packet Access);
- HSPA+ (High Speed Packet Access Plus);
- UMTS-TDD (Universal Mobile Telecommunications System—Time-Division Duplex);
- TD-CDMA (Time Division—Code Division Multiple Access);
- TD-CDMA (Time Division—Synchronous Code Division Multiple Access);
- 3GPP Rel. 8 (Pre-4G) (3rd Generation Partnership Project Release 8 (Pre-4th Generation));
- UTRA (UMTS Terrestrial Radio Access);
- E-UTRA (Evolved UMTS Terrestrial Radio Access);
- LTE Advanced (4G) (Long Term Evolution Advanced (4th Generation));
- cdmaOne (2G);
- CDMA2000 (3G) (Code division multiple access 2000 (Third generation));
- EV-DO (Evolution-Data Optimized or Evolution-Data Only);
- AMPS (1G) (Advanced Mobile Phone System (1st Generation));
- TACS/ETACS (Total Access Communication System/Extended Total Access Communication System);
- D-AMPS (2G) (Digital AMPS (2nd Generation));
- PTT (Push-to-talk);

MTS (Mobile Telephone System);
IMTS (Improved Mobile Telephone System);
AMTS (Advanced Mobile Telephone System);
OLT (Norwegian for Offentlig Landmobil Telefoni, Public Land Mobile Telephony);
MTD (Swedish abbreviation for Mobiltelefonisystem D, or Mobile telephony system D);
Autotel/PALM (Public Automated Land Mobile);
ARP (Finnish for Autoradiopuhelin, "car radio phone");
NMT (Nordic Mobile Telephony);
Hicap (High capacity version of NTT (Nippon Telegraph and Telephone));
CDPD (Cellular Digital Packet Data);
DataTAC;
iDEN (Integrated Digital Enhanced Network);
PDC (Personal Digital Cellular);
PHS (Personal Handy-phone System);
WiDEN (Wideband Integrated Digital Enhanced Network);
iBurst; and
Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

Furthermore, in various embodiments, the at least one radio communication technology family may include a radio communication technology in which the access to radio resources is provided in a random manner (in other words, a random access technology is provided). The at least one other radio communication technology family may include a radio communication technology in which the access to radio resources is provided in a centrally controlled manner.

Furthermore, in various embodiments, the at least one radio communication technology family may include a radio communication technology in which the access to radio resources is provided in a centrally controlled manner. The at least one other radio communication technology family may include a radio communication technology in which the access to radio resources is provided in a random manner (in other words, a random access technology is provided).

Furthermore, in various embodiments, the mobile radio communication device 400 may include a power supply switch 406 configured to provide (electrical) power to the receiver 302 or to the radio communication protocol controller 304. Furthermore, the mobile radio communication device 400 may include a power supply switch controller 408 configured to control the power supply switch 406 with respect to the power supply. The power supply switch controller 408 may be configured to control the power supply switch 406 to deactivate power supply to the receiver 302 while the radio communication protocol controller 304 performs processing. In an embodiment, the power supply switch 406 may be configured to additionally (e.g. selectively) provide (electrical) power to e.g. the decoder 402, the further receiver 410, the first memory 412, the working memory 416, the receiver controller 420, and the radio scanner 422.

In various embodiments, the mobile radio communication device 400 may further include a further receiver 410 coupled to the radio communication protocol controller 304 such that the receiver characteristics of the further receiver 410 may be controlled by the radio communication protocol controller 304.

In various embodiments, the radio communication protocol controller 304 may be configured to provide at least one of the following radio communication protocols of the at least one radio communication technology of the at least one other radio communication technology family:
 a physical radio communication protocol layer radio communication protocol;
 a medium access control (MAC) radio communication protocol layer radio communication protocol; and
 a network radio communication protocol layer radio communication protocol.

In an embodiment, the receiver 302 may be configured to receive at least a portion of the at least one radio communication protocol of the at least one radio communication technology of the at least one other radio communication technology family (e.g. together with or separate from the received pilot information).

Furthermore, in various embodiments, the mobile radio communication device 400 may further include a first memory 412 configured to store the program code 414 implementing at least a portion of the at least one radio communication protocol of the at least one radio communication technology of the at least one other radio communication technology family.

Furthermore, in various embodiments, the mobile radio communication device 400 may further include a working memory 416 coupled to the radio communication protocol controller 304, wherein the working memory 416 may store the program code 418 (which may include the program code 414 stored in the first memory 412, which may be transferred into the working memory 416) the radio communication protocol controller 304 uses to provide at least one radio communication protocol of the at least one radio communication technology of the at least one other radio communication technology family based on the received pilot information.

In various embodiments, the radio communication protocol controller 304 may be configured to load the required portion of the program code 414 of the at least one radio communication protocol of the at least one radio communication technology of the at least one other radio communication technology family from the first memory 412 into the working memory 416.

Furthermore, in various embodiments, the mobile radio communication device 400 may optionally further include a receiver controller 420 configured to control the receiver 302 such that only predefined pilot information is forwarded to the radio communication protocol controller 304.

In an embodiment, the predefined pilot information may include pilot information of at least one predefined radio communication technology of at least one other radio communication technology family.

Furthermore, in various embodiments, the mobile radio communication device 400 may optionally further include a radio scanner 422 configured to scan for radio communication signals other than the signals received by the receiver 302.

In various embodiments, the decoder 402, the power supply switch controller 408, the further receiver 410, the first memory 412, the working memory 416, the receiver controller 420, and the radio scanner 422 may be coupled with each other, e.g. via an electrical connection 306 such as e.g. a cable or a computer bus or via any other suitable electrical connection to exchange electrical signals.

Figure 5:
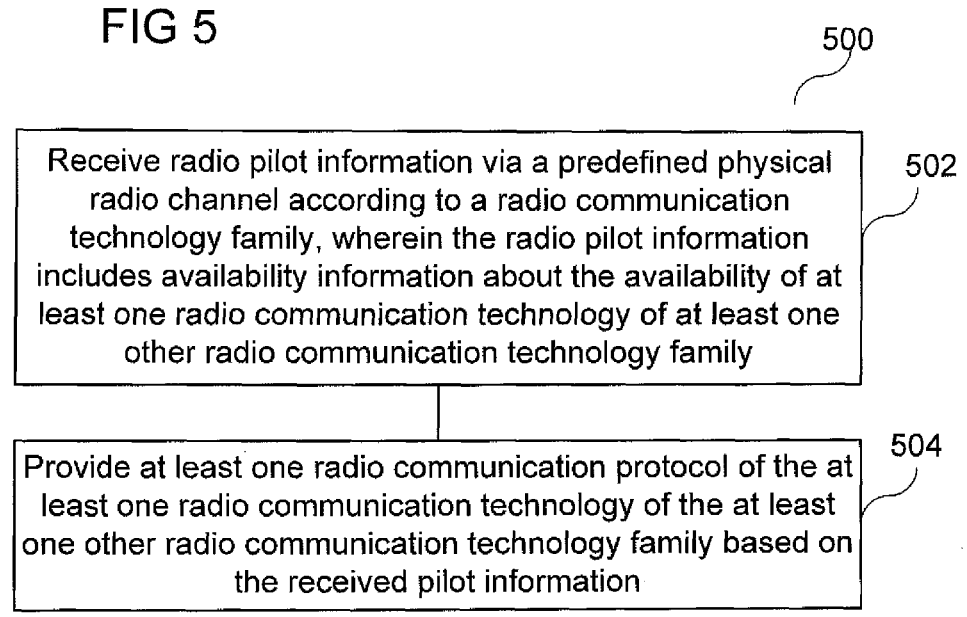
FIG. 5 shows a flow diagram illustrating a method for controlling a mobile radio communication device in accordance with an embodiment.

FIG. 5 shows a flow diagram 500 illustrating a method for controlling a mobile radio communication device. The method may include, in 502, receiving radio pilot information via a predefined physical radio channel according to a radio communication technology family, wherein the radio pilot information includes availability information about the availability of at least one radio communication technology of at least one other radio communication technology family, and, in 504, providing at least one radio communication protocol of the at least one radio communication technology of the at least one other radio communication technology family based on the received pilot information.

The at least one radio communication protocol of the at least one radio communication technology of the at least one other radio communication technology family may be provided by a radio communication protocol controller having a programmable controller, e.g. a microprocessor (e.g. a Complex Instruction Set Computer (CISC) microprocessor or a Reduced Instruction Set Computer (RISC) microprocessor).

The method may further include decoding the received pilot information.

The decoding may be carried out by a decoder including at least one radio baseband circuit configured to decode the received pilot information (which may be implemented on the same chip (e.g. in the same processor, e.g. in the same microprocessor) as the radio communication protocol controller or on a separate chip).

The decoding may include one of the following processes:
demodulating the received physical channel signal; and
extracting the pilot information from the received physical channel signal.

In various embodiments, the predefined physical channel may be a Cognitive Pilot Channel.

In various embodiments, the predefined physical channel may be a non-cognitive physical channel, wherein the pilot information is received via a Virtual Cognitive Pilot Channel (which may be decoded in higher radio communication layers such as e.g. a network communication layer or an application communication layer).

The at least one radio communication technology family may include one or more of the following radio communication technology families:
a Short Range radio communication technology family;
a Metropolitan Area System radio communication technology family; and
a Cellular Wide Area radio communication technology family.

In various embodiments, the Short Range radio communication technology family may include at least one of the following radio communication technologies:
a Bluetooth radio communication technology;
an Ultra Wide Band (UWB) radio communication technology;
a Wireless Local Area Network radio communication technology (e.g. according to an IEEE 802.11 (e.g. IEEE 802.11n) radio communication standard);
IrDA (Infrared Data Association);
Z-Wave;
ZigBee;
HiperLAN/2 (HIgh PErformance Radio LAN; an alternative ATM-like 5 GHz standardized technology);
IEEE 802.11a (5 GHz);
IEEE 802.11g (2.4 GHz); and
IEEE 802.11 VHT (VHT=Very High Throughput).

Furthermore, the Short Range radio communication technology family may be divided into the following Short Range radio communication technology sub-families:
a personal area networks (Wireless PANs) radio communication Short Range radio communication technology sub-family, which may include e.g. IrDA (Infrared Data Association), Bluetooth, UWB, Z-Wave and ZigBee; and
a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:
a Worldwide Interoperability for Microwave Access (WiMax) (e.g. according to an IEEE 802.16 radio communication standard, e.g. WiMax fixed radio communication standard or WiMax mobile radio communication standard);
WiPro;
HiperMAN (High Performance Radio Metropolitan Area Network); and
IEEE 802.16m Advanced Air Interface Furthermore, the Metropolitan Area System radio communication technology family may be divided into the following Metropolitan Area System radio communication technology sub-families:
a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:

a Global System for Mobile Communications (GSM) radio communication technology;
a General Packet Radio Service (GPRS) radio communication technology;
an Enhanced Data Rates for GSM Evolution (EDGE) radio communication technology; and
a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));
CDMA2000 (Code division multiple access 2000);
CDPD (Cellular Digital Packet Data);
Mobitex;
3G (Third Generation);
CSD (Circuit Switched Data);
HSCSD (High-Speed Circuit-Switched Data);
UMTS (3G) (Universal Mobile Telecommunications System (Third Generation));
W-CDMA (UMTS) (Wideband Code Division Multiple Access (Universal Mobile Telecommunications System));
HSPA (High Speed Packet Access);
HSDPA (High-Speed Downlink Packet Access);
HSUPA (High-Speed Uplink Packet Access);
HSPA+ (High Speed Packet Access Plus);
UMTS-TDD (Universal Mobile Telecommunications System—Time-Division Duplex);
TD-CDMA (Time Division—Code Division Multiple Access);
TD-CDMA (Time Division—Synchronous Code Division Multiple Access);
3GPP Rel. 8 (Pre-4G) (3rd Generation Partnership Project Release 8 (Pre-4th Generation));
UTRA (UMTS Terrestrial Radio Access);
E-UTRA (Evolved UMTS Terrestrial Radio Access);
LTE Advanced (4G) (Long Term Evolution Advanced (4th Generation));
cdmaOne (2G);
CDMA2000 (3G) (Code division multiple access 2000 (Third generation));
EV-DO (Evolution-Data Optimized or Evolution-Data Only);
AMPS (1G) (Advanced Mobile Phone System (1st Generation));
TACS/ETACS (Total Access Communication System/Extended Total Access Communication System);
D-AMPS (2G) (Digital AMPS (2nd Generation));
PTT (Push-to-talk);
MTS (Mobile Telephone System);
IMTS (Improved Mobile Telephone System);
AMTS (Advanced Mobile Telephone System);
OLT (Norwegian for Offentlig Landmobil Telefoni, Public Land Mobile Telephony);
MTD (Swedish abbreviation for Mobiltelefonisystem D, or Mobile telephony system D);
Autotel/PALM (Public Automated Land Mobile);
ARP (Finnish for Autoradiopuhelin, "car radio phone");
NMT (Nordic Mobile Telephony);
Hicap (High capacity version of NTT (Nippon Telegraph and Telephone));
CDPD (Cellular Digital Packet Data);
DataTAC;
iDEN (Integrated Digital Enhanced Network);
PDC (Personal Digital Cellular);
PHS (Personal Handy-phone System);
WiDEN (Wideband Integrated Digital Enhanced Network);
iBurst; and
Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

In various embodiments, the at least one other radio communication technology family may include one or more of the following radio communication technology families:
- a Short Range radio communication technology family;
- a Metropolitan Area System radio communication technology family; and
- a Cellular Wide Area radio communication technology family.

In various embodiments, the Short Range radio communication technology family may include at least one of the following radio communication technologies:
- a Bluetooth radio communication technology;
- an Ultra Wide Band (UWB) radio communication technology;
- a Wireless Local Area Network radio communication technology (e.g. according to an IEEE 802.11 (e.g. IEEE 802.11n) radio communication standard);
- IrDA (Infrared Data Association);
- Z-Wave;
- ZigBee;
- HiperLAN/2 (HIgh PErformance Radio LAN; an alternative ATM-like 5 GHz standardized technology);
- IEEE 802.11a (5 GHz);
- IEEE 802.11g (2.4 GHz); and
- IEEE 802.11 VHT (VHT=Very High Throughput).

Furthermore, the Short Range radio communication technology family may be divided into the following Short Range radio communication technology sub-families:
- a personal area networks (Wireless PANs) radio communication sub-family, which may include e.g. IrDA (Infrared Data Association), Bluetooth, UWB, Z-Wave and ZigBee; and
- a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:
- a Worldwide Interoperability for Microwave Access (WiMax) (e.g. according to an IEEE 802.16 radio communication standard, e.g. WiMax fixed radio communication standard or WiMax mobile radio communication standard);
- WiPro;
- HiperMAN (High Performance Radio Metropolitan Area Network); and
- IEEE 802.16m Advanced Air Interface Furthermore, the Metropolitan Area System radio communication technology family may be divided into the following Metropolitan Area System radio communication technology sub-families:
- a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and
- a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:
- a Global System for Mobile Communications (GSM) radio communication technology;
- a General Packet Radio Service (GPRS) radio communication technology;
- an Enhanced Data Rates for GSM Evolution (EDGE) radio communication technology; and
- a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));
- CDMA2000 (Code division multiple access 2000);
- CDPD (Cellular Digital Packet Data);
- Mobitex;
- 3G (Third Generation);
- CSD (Circuit Switched Data);
- HSCSD (High-Speed Circuit-Switched Data);
- UMTS (3G) (Universal Mobile Telecommunications System (Third Generation));
- W-CDMA (UMTS) (Wideband Code Division Multiple Access (Universal Mobile Telecommunications System));
- HSPA (High Speed Packet Access);
- HSDPA (High-Speed Downlink Packet Access);
- HSUPA (High-Speed Uplink Packet Access);
- HSPA+ (High Speed Packet Access Plus);
- UMTS-TDD (Universal Mobile Telecommunications System—Time-Division Duplex);
- TD-CDMA (Time Division—Code Division Multiple Access);
- TD-CDMA (Time Division—Synchronous Code Division Multiple Access);
- 3GPP Rel. 8 (Pre-4G) (3rd Generation Partnership Project Release 8 (Pre-4th Generation));
- UTRA (UMTS Terrestrial Radio Access);
- E-UTRA (Evolved UMTS Terrestrial Radio Access);
- LTE Advanced (4G) (Long Term Evolution Advanced (4th Generation));
- cdmaOne (2G);
- CDMA2000 (3G) (Code division multiple access 2000 (Third generation));
- EV-DO (Evolution-Data Optimized or Evolution-Data Only);
- AMPS (1G) (Advanced Mobile Phone System (1st Generation));
- TACS/ETACS (Total Access Communication System/Extended Total Access Communication System);
- D-AMPS (2G) (Digital AMPS (2nd Generation));
- PTT (Push-to-talk);
- MTS (Mobile Telephone System);
- IMTS (Improved Mobile Telephone System);
- AMTS (Advanced Mobile Telephone System);
- OLT (Norwegian for Offentlig Landmobil Telefoni, Public Land Mobile Telephony);
- MTD (Swedish abbreviation for Mobiltelefonisystem D, or Mobile telephony system D);
- Autotel/PALM (Public Automated Land Mobile);
- ARP (Finnish for Autoradiopuhelin, "car radio phone");
- NMT (Nordic Mobile Telephony);

Hicap (High capacity version of NTT (Nippon Telegraph and Telephone));
CDPD (Cellular Digital Packet Data);
DataTAC;
iDEN (Integrated Digital Enhanced Network);
PDC (Personal Digital Cellular);
PHS (Personal Handy-phone System);
WiDEN (Wideband Integrated Digital Enhanced Network);
iBurst; and
Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

Furthermore, in various embodiments, the at least one radio communication technology family may include a radio communication technology in which the access to radio resources is provided in a random manner (in other words, a random access technology is provided). The at least one other radio communication technology family may include a radio communication technology in which the access to radio resources is provided in a centrally controlled manner.

Furthermore, in various embodiments, the at least one radio communication technology family may include a radio communication technology in which the access to radio resources is provided in a centrally controlled manner. The at least one other radio communication technology family may include a radio communication technology in which the access to radio resources is provided in a random manner (in other words, a random access technology is provided).

The method may further include selectively providing power to the receiver or the radio communication protocol controller.

In various embodiments, the method may further include controlling a further receiver coupled to a radio communication protocol controller providing at least one radio communication protocol of the at least one radio communication technology of the at least one other radio communication technology family such that the receiver characteristics of the further receiver may be controlled by the radio communication protocol controller.

In an embodiment, providing at least one radio communication protocol of the at least one radio communication technology of the at least one other radio communication technology family may include providing at least one of the following radio communication protocols of the at least one radio communication technology of the at least one other radio communication technology family:
  a physical radio communication protocol layer radio communication protocol;
  a medium access control (MAC) radio communication protocol layer radio communication protocol; and
  a network radio communication protocol layer radio communication protocol.

The method may further include receiving at least a portion of the at least one radio communication protocol of the at least one radio communication technology of the at least one other radio communication technology family (together with or separate from the pilot information).

In various embodiments, the method may further include storing program code implementing at least a portion of the at least one radio communication protocol of the at least one radio communication technology of the at least one other radio communication technology family in a first memory.

In various embodiments, the method may further include storing program code a radio communication protocol controller uses to provide at least one radio communication protocol of the at least one radio communication technology of the at least one other radio communication technology family based on the received pilot information in a working memory coupled to the radio communication protocol controller.

The required portion of the program code of the at least one radio communication protocol of the at least one radio communication technology of the at least one other radio communication technology family may be loaded from the first memory into the working memory.

In various embodiments, the method may further include forwarding only predefined received pilot information to a radio communication protocol controller.

In various embodiments, the predefined pilot information may include pilot information of at least one predefined radio communication technology of at least one other radio communication technology family.

In various embodiments, the method may further include radio scanning for radio communication signals other than the signals received by the receiver.

Figure 6:
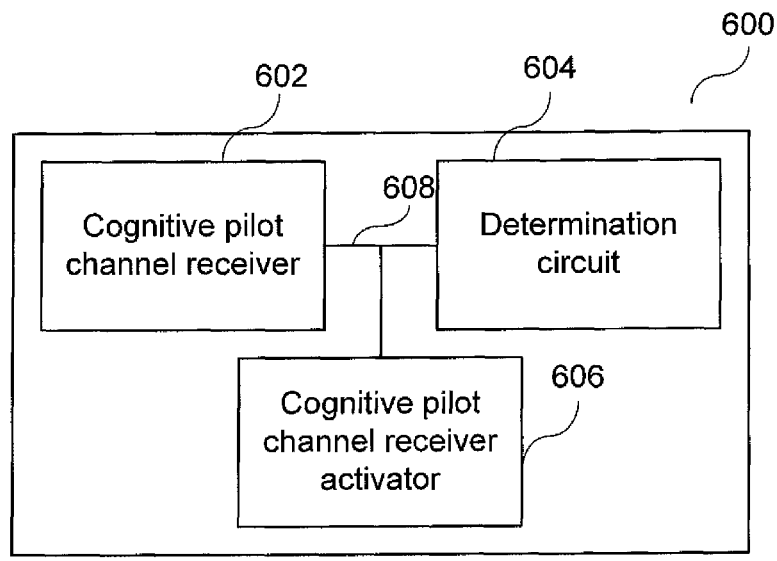
FIG. 6 shows a radio communication device in accordance with yet another embodiment.

FIG. 6 shows a radio communication device 600 in accordance with yet another embodiment.

In various embodiments, the radio communication device 600 may include a cognitive pilot channel receiver 602 configured to receive cognitive pilot channel information via a predefined physical radio channel. The radio communication device 600 may further include a determination circuit 604 configured to determine as to whether a predefined receiving criterion of the receiving of radio signals is fulfilled. Furthermore, the radio communication device 600 may include a cognitive pilot channel receiver activator 606 configured to activate the cognitive pilot channel receiver 602 based on whether the predefined receiving criterion of the receiving of radio signals is fulfilled or not. The cognitive pilot channel receiver 602, the determination circuit 604, and the cognitive pilot channel receiver activator 606 may be coupled with each other, e.g. via an electrical connection 608 such as e.g. a cable or a computer bus or via any other suitable electrical connection to exchange electrical signals.

Figure 7:
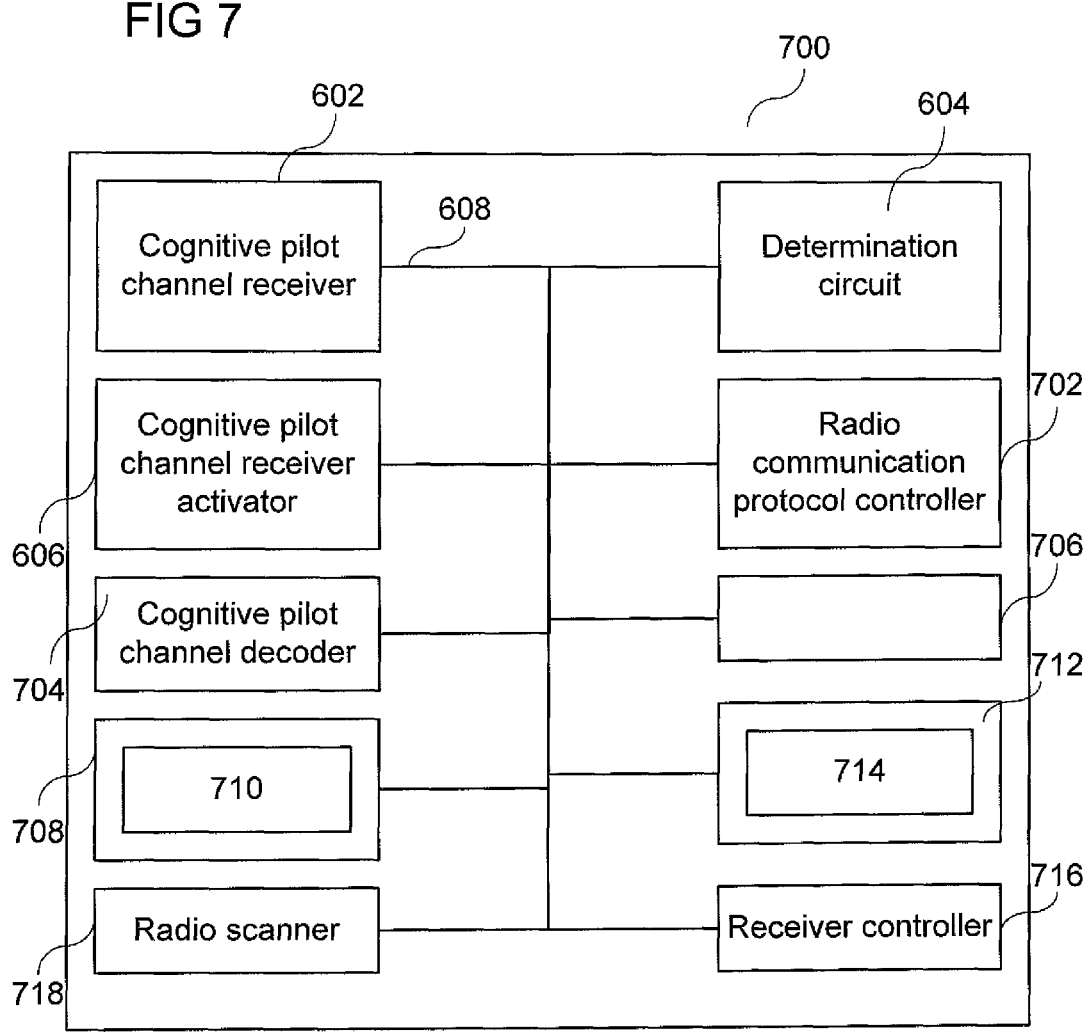
FIG. 7 shows a radio communication device in accordance with yet another embodiment.

FIG. 7 shows a radio communication device 700 in accordance with yet another embodiment.

As shown in FIG. 7, in addition to the components of the radio communication device 600 of FIG. 6, the radio communication device 700 may include a radio communication protocol controller 702 configured to provide at least one radio communication protocol of at least one radio communication technology of at least one radio communication technology family selected from a plurality of different radio communication technology families. The radio communication protocol controller 702 may include or be formed by a programmable controller, e.g. a microprocessor (e.g. a Complex Instruction Set Computer (CISC) microprocessor or a Reduced Instruction Set Computer (RISC) microprocessor).

In various embodiments, the determination circuit 604 may be configured to determine as to whether a predefined receiving criterion relating to the receiving quality of the received radio signals is fulfilled. Furthermore, the cognitive pilot channel receiver activator 606 may be configured to activate the cognitive pilot channel receiver 602 based on whether the receiving quality of the received radio signals is lower than a predefined receiving quality threshold.

In various embodiments, the radio communication device 700 may further include a cognitive pilot channel decoder 704 configured to decode the received cognitive pilot channel information. In various embodiments, the cognitive pilot channel decoder 704 may include at least one radio baseband circuit configured to decode the received cognitive pilot channel information (which may be implemented on the same chip (e.g. in the same processor, e.g. in the same microprocessor) as the radio communication protocol controller, or on a separate chip). The at least one radio baseband circuit may include at least one radio baseband circuit configured to provide at least one of the following baseband functions:

demodulation of the received cognitive pilot channel signal; and extraction of the cognitive pilot channel information from the received physical channel signal.

In various embodiments, the predefined physical channel is a Cognitive Pilot Channel.

In various embodiments, the predefined physical channel is a non-cognitive physical channel, wherein the pilot information is received via a Virtual Cognitive Pilot Channel (which may be decoded in higher radio communication layers such as e.g. a network communication layer or an application communication layer).

In various embodiments, the at least one radio communication technology family may include at least one of the following radio communication technology families:

a Short Range radio communication technology family;

a Metropolitan Area System radio communication technology family; and a Cellular Wide Area radio communication technology family.

In various embodiments, the Short Range radio communication technology family may include at least one of the following radio communication technologies:

a Bluetooth radio communication technology;

an Ultra Wide Band (UWB) radio communication technology;

a Wireless Local Area Network radio communication technology (e.g. according to an IEEE 802.11 (e.g. IEEE 802.11n) radio communication standard);

IrDA (Infrared Data Association);

Z-Wave;

ZigBee;

HiperLAN/2 (HIgh PErformance Radio LAN; an alternative ATM-like 5 GHz standardized technology);

IEEE 802.11a (5 GHz);

IEEE 802.11g (2.4 GHz); and

IEEE 802.11 VHT (VHT=Very High Throughput).

Furthermore, the Short Range radio communication technology family may be divided into the following Short Range radio communication technology sub-families:

a personal area networks (Wireless PANs) radio communication sub-family, which may include e.g. IrDA (Infrared Data Association), Bluetooth, UWB, Z-Wave and ZigBee; and a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:

a Worldwide Interoperability for Microwave Access (WiMax) (e.g. according to an IEEE 802.16 radio communication standard, e.g. WiMax fixed radio communication standard or WiMax mobile radio communication standard);

WiPro;

HiperMAN (High Performance Radio Metropolitan Area Network); and

IEEE 802.16m Advanced Air Interface

Furthermore, the Metropolitan Area System radio communication technology family may be divided into the following Metropolitan Area System radio communication technology sub-families:

a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g.

WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:

a Global System for Mobile Communications (GSM) radio communication technology;
a General Packet Radio Service (GPRS) radio communication technology;
an Enhanced Data Rates for GSM Evolution (EDGE) radio communication technology; and
a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));
CDMA2000 (Code division multiple access 2000);
CDPD (Cellular Digital Packet Data);
Mobitex;
3G (Third Generation);
CSD (Circuit Switched Data);
HSCSD (High-Speed Circuit-Switched Data);
UMTS (3G) (Universal Mobile Telecommunications System (Third Generation));
W-CDMA (UMTS) (Wideband Code Division Multiple Access (Universal Mobile Telecommunications System));
HSPA (High Speed Packet Access);
HSDPA (High-Speed Downlink Packet Access);
HSUPA (High-Speed Uplink Packet Access);
HSPA+ (High Speed Packet Access Plus);
UMTS-TDD (Universal Mobile Telecommunications System—Time-Division Duplex);
TD-CDMA (Time Division—Code Division Multiple Access);
TD-CDMA (Time Division—Synchronous Code Division Multiple Access);
3GPP Rel. 8 (Pre-4G) (3rd Generation Partnership Project Release 8 (Pre-4th Generation));
UTRA (UMTS Terrestrial Radio Access);
E-UTRA (Evolved UMTS Terrestrial Radio Access);
LTE Advanced (4G) (Long Term Evolution Advanced (4th Generation));
cdmaOne (2G);
CDMA2000 (3G) (Code division multiple access 2000 (Third generation));
EV-DO (Evolution-Data Optimized or Evolution-Data Only);
AMPS (1G) (Advanced Mobile Phone System (1st Generation));
TACS/ETACS (Total Access Communication System/Extended Total Access Communication System);
D-AMPS (2G) (Digital AMPS (2nd Generation));
PTT (Push-to-talk);
MTS (Mobile Telephone System);
IMTS (Improved Mobile Telephone System);
AMTS (Advanced Mobile Telephone System);
OLT (Norwegian for Offentlig Landmobil Telefoni, Public Land Mobile Telephony);
MTD (Swedish abbreviation for Mobiltelefonisystem D, or Mobile telephony system D);
Autotel/PALM (Public Automated Land Mobile);
ARP (Finnish for Autoradiopuhelin, "car radio phone");
NMT (Nordic Mobile Telephony);
Hicap (High capacity version of NTT (Nippon Telegraph and Telephone));
CDPD (Cellular Digital Packet Data);
DataTAC;
iDEN (Integrated Digital Enhanced Network);
PDC (Personal Digital Cellular);
PHS (Personal Handy-phone System);
WiDEN (Wideband Integrated Digital Enhanced Network);
iBurst; and
Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

In various embodiments, the radio communication device 700 may further include a further receiver 706 coupled to the radio communication protocol controller 702 such that the receiver characteristics of the further receiver 706 may be controlled by the radio communication protocol controller 702.

In an embodiment, the radio communication protocol controller 702 may be configured to provide at least one of the following radio communication protocols of the at least one radio communication technology of the at least one radio communication technology family:
- a physical radio communication protocol layer radio communication protocol;
- a medium access control (MAC) radio communication protocol layer radio communication protocol; and
- a network radio communication protocol layer radio communication protocol.

In an embodiment, the cognitive pilot channel receiver 602 may be configured to receive at least a portion of the at least one radio communication protocol of the at least one radio communication technology of the at least one radio communication technology family (together with or separate from the pilot information).

In various embodiments, the radio communication device 700 may further include a first memory 708 configured to store program code 710 implementing at least a portion of the at least one radio communication protocol of the at least one radio communication technology of the at least one radio communication technology family.

In various embodiments, the radio communication device 700 may further include a working memory 712 coupled to the radio communication protocol controller 702, wherein the working memory 712 stores the program code 714 the radio communication protocol controller 702 uses to provide at least one radio communication protocol of the at least one radio communication technology of the at least one radio communication technology family based on the received cognitive pilot channel information.

The radio communication protocol controller 702 may be configured to load the required portion of the program code 714 of the at least one radio communication protocol of the at least one radio communication technology of the at least one radio communication technology family from the first memory 708 into the working memory 712.

In various embodiments, the radio communication device 700 may further include a receiver controller 716 configured to control the cognitive pilot channel receiver 602 (or the further receiver 706 in case of a V-CPC) such that only predefined pilot information is forwarded to the radio communication protocol controller 702.

In an embodiment, the predefined cognitive pilot channel information may include cognitive pilot channel information of at least one predefined radio communication technology of at least one radio communication technology family.

In various embodiments, the radio communication device 700 may further include a radio scanner 718 configured to scan for radio communication signals other than the signals received by the cognitive pilot channel receiver.

Figure 8:
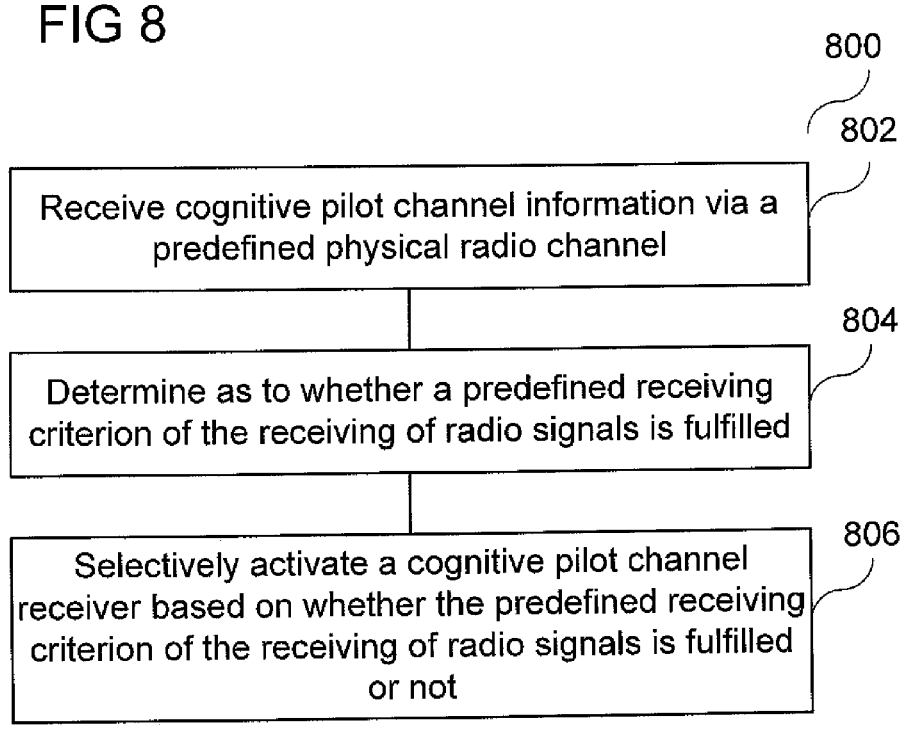
FIG. 8 shows a flow diagram illustrating a method for controlling a mobile radio communication device in accordance with an embodiment.

FIG. 8 shows a flow diagram 800 illustrating a method for controlling a mobile radio communication device in accordance with an embodiment.

In various embodiments, the method may include, in 802, receiving cognitive pilot channel information via a predefined physical radio channel. The method may further include, in 804, determining as to whether a predefined receiving criterion of the receiving of radio signals is fulfilled, and, in 806, selectively activating a cognitive pilot channel receiver based on whether the predefined receiving criterion of the receiving of radio signals is fulfilled or not.

In an implementation, determining as to whether a predefined receiving criterion of the receiving of radio signals is fulfilled may include determining as to whether a predefined receiving criterion relating to the receiving quality of the received radio signals is fulfilled. Furthermore, the selective activating of the cognitive pilot channel receiver may include activating the cognitive pilot channel receiver based on whether the receiving quality of the received radio signals is lower than a predefined receiving quality threshold (and the V-CPC is not activated or not available, in other words, in this case it may provided to activate the components for receiving and evaluating the information contained in the physical cognitive pilot channel, whereas in case the V-CPC is available, it may be sufficient to evaluate the information contained in the V-CPC).

In various embodiments, the method may further include providing at least one radio communication protocol of at least one radio communication technology of at least one radio communication technology family selected from a plurality of different radio communication technology families.

In various embodiments, the method may further include decoding the received cognitive pilot channel information.

In various embodiments, the decoding may be carried out by a decoder comprising at least one radio baseband circuit configured to decode the received pilot information (which may be implemented on the same chip (e.g. in the same processor, e.g. in the same microprocessor) as the radio communication protocol controller or on a separate chip).

The decoding may include one of the following processes:
- demodulating the received physical channel signal; and
- extracting the pilot information from the received physical channel signal.

In various embodiments, the predefined physical channel may be a Cognitive Pilot Channel.

In various embodiments, the predefined physical channel may be a non-cognitive physical channel, and the pilot information may be received via a Virtual Cognitive Pilot Channel (which may be decoded in higher radio communication layers such as e.g. a network communication layer or an application communication layer).

In various embodiments, the at least one radio communication technology family may include at least one of the following radio communication technology families:
- a Short Range radio communication technology family;
- a Metropolitan Area System radio communication technology family; and
- a Cellular Wide Area radio communication technology family.

In various embodiments, the Short Range radio communication technology family may include at least one of the following radio communication technologies:
- a Bluetooth radio communication technology;
- an Ultra Wide Band (UWB) radio communication technology;
- a Wireless Local Area Network radio communication technology (e.g. according to an IEEE 802.11 (e.g. IEEE 802.11n) radio communication standard);
- IrDA (Infrared Data Association);
- Z-Wave;
- ZigBee;
- HiperLAN/2 (HIgh PErformance Radio LAN; an alternative ATM-like 5 GHz standardized technology);
- IEEE 802.11a (5 GHz);
- IEEE 802.11g (2.4 GHz); and
- IEEE 802.11 VHT (VHT=Very High Throughput).

Furthermore, the Short Range radio communication technology family may be divided into the following Short Range radio communication technology sub-families:

a personal area networks (Wireless PANs) radio communication sub-family, which may include e.g. IrDA (Infrared Data Association), Bluetooth, UWB, Z-Wave and ZigBee; and a wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput).

In various embodiments, the Metropolitan Area System radio communication technology family may include at least one of the following radio communication technologies:

a Worldwide Interoperability for Microwave Access (WiMax) (e.g. according to an IEEE 802.16 radio communication standard, e.g. WiMax fixed radio communication standard or WiMax mobile radio communication standard);

WiPro;

HiperMAN (High Performance Radio Metropolitan Area Network); and

IEEE 802.16m Advanced Air Interface.

Furthermore, the Metropolitan Area System radio communication technology family may be divided into the following Metropolitan Area System radio communication technology sub-families:

a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

In various embodiments, the Cellular Wide Area radio communication technology family may include at least one of the following radio communication technologies:

a Global System for Mobile Communications (GSM) radio communication technology;

a General Packet Radio Service (GPRS) radio communication technology;

an Enhanced Data Rates for GSM Evolution (EDGE) radio communication technology; and a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced));

CDMA2000 (Code division multiple access 2000);

CDPD (Cellular Digital Packet Data);

Mobitex;

3G (Third Generation);

CSD (Circuit Switched Data);

HSCSD (High-Speed Circuit-Switched Data);

UMTS (3G) (Universal Mobile Telecommunications System (Third Generation));

W-CDMA (UMTS) (Wideband Code Division Multiple Access (Universal Mobile Telecommunications System));

HSPA (High Speed Packet Access);

HSDPA (High-Speed Downlink Packet Access);

HSUPA (High-Speed Uplink Packet Access);

HSPA+ (High Speed Packet Access Plus);

UMTS-TDD (Universal Mobile Telecommunications System—Time-Division Duplex);

TD-CDMA (Time Division—Code Division Multiple Access);

TD-CDMA (Time Division—Synchronous Code Division Multiple Access);

3GPP Rel. 8 (Pre-4G) (3rd Generation Partnership Project Release 8 (Pre-4th Generation));

UTRA (UMTS Terrestrial Radio Access);

E-UTRA (Evolved UMTS Terrestrial Radio Access);

LTE Advanced (4G) (Long Term Evolution Advanced (4th Generation));

cdmaOne (2G);

CDMA2000 (3G) (Code division multiple access 2000 (Third generation));

EV-DO (Evolution-Data Optimized or Evolution-Data Only);

AMPS (1G) (Advanced Mobile Phone System (1st Generation));

TACS/ETACS (Total Access Communication System/Extended Total Access Communication System);

D-AMPS (2G) (Digital AMPS (2nd Generation));

PTT (Push-to-talk);

MTS (Mobile Telephone System);

IMTS (Improved Mobile Telephone System);

AMTS (Advanced Mobile Telephone System);

OLT (Norwegian for Offentlig Landmobil Telefoni, Public Land Mobile Telephony);

MTD (Swedish abbreviation for Mobiltelefonisystem D, or Mobile telephony system D);

Autotel/PALM (Public Automated Land Mobile);

ARP (Finnish for Autoradiopuhelin, "car radio phone");

NMT (Nordic Mobile Telephony);

Hicap (High capacity version of NTT (Nippon Telegraph and Telephone));

CDPD (Cellular Digital Packet Data);

DataTAC;

iDEN (Integrated Digital Enhanced Network);

PDC (Personal Digital Cellular);

PHS (Personal Handy-phone System);

WiDEN (Wideband Integrated Digital Enhanced Network);

iBurst; and

Unlicensed Mobile Access (UMA, also referred to as 3GPP Generic Access Network, or GAN standard).

The Cellular Wide Area radio communication technology family may also be considered as a Wireless Wide Area Network (Wireless WAN) radio communication technology family, which may include e.g. (computer) networks that cover a broad area (i.e., any network whose communications links cross metropolitan, regional, or national boundaries) and may include e.g. GPRS, CDMA2000 (Code division multiple access 2000), GSM, CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), FOMA (Freedom of Multimedia Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as 3GPP Generic Access Network, or GAN standard).

In various embodiments, the method may further include controlling receiver characteristics of a further receiver coupled to a radio communication protocol controller by means of the radio communication protocol controller.

In various embodiments, a radio communication protocol controller may provide at least one radio communication protocol of the at least one radio communication technology of at least one of the following radio communication technology families:
- a physical radio communication protocol layer radio communication protocol;
- a medium access control (MAC) radio communication protocol layer radio communication protocol; and
- a network radio communication protocol layer radio communication protocol.

In various embodiments, the cognitive pilot channel receiver may receive at least a portion of the at least one radio communication protocol of the at least one radio communication technology of the at least one radio communication technology family (together with or separate from the pilot information).

In various embodiments, the method may further include storing program code implementing at least a portion of the at least one radio communication protocol of the at least one radio communication technology of the at least one radio communication technology family in a first memory.

In various embodiments, the method may further include storing program code a radio communication protocol controller uses to provide at least one radio communication protocol of the at least one radio communication technology of the at least one radio communication technology family based on the received cognitive pilot channel information in a working memory coupled to the radio communication protocol controller.

In various embodiments, the radio communication protocol controller may load the required portion of the program code of the at least one radio communication protocol of the at least one radio communication technology of the at least one radio communication technology family from the first memory into the working memory.

In various embodiments, the method may further include controlling the cognitive pilot channel receiver such that only predefined pilot information is forwarded to a radio communication protocol controller.

In various embodiments, the predefined cognitive pilot channel information may include cognitive pilot channel information of at least one predefined radio communication technology of at least one other radio communication technology family.

In various embodiments, the method may further include radio scanning for radio communication signals other than the signals received by the cognitive pilot channel receiver.

Figure 9:
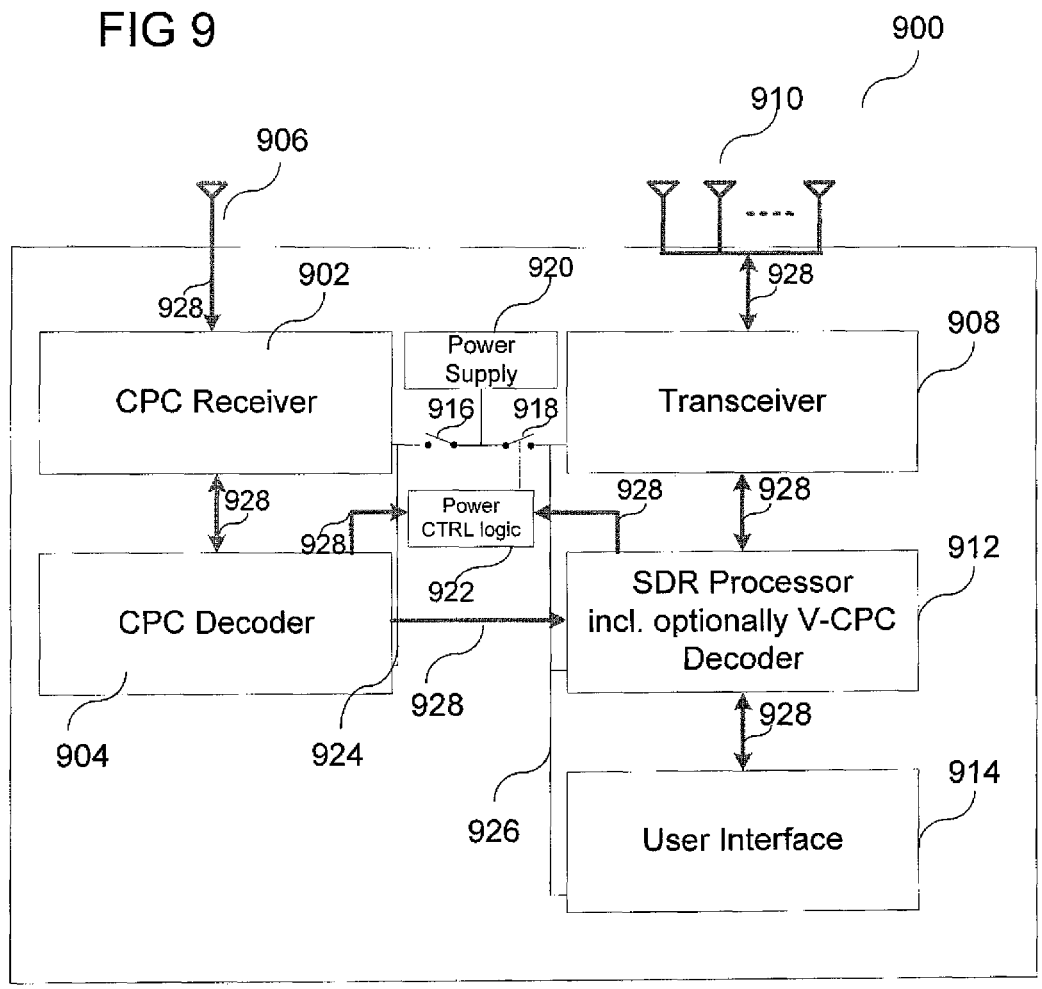
FIG. 9 shows a radio communication device in accordance with yet another embodiment.

FIG. 9 shows a radio communication device 900 in accordance with yet another embodiment. As shown in FIG. 9, the radio communication device 900 may include a cognitive pilot channel receiver 902 (in an alternative embodiment, a cognitive pilot channel transceiver 902), and a cognitive pilot channel decoder 904 coupled with the cognitive pilot channel receiver 902. The radio communication device 900 may further include at least one CPC antenna 906 coupled to the cognitive pilot channel receiver 902 and configured to receive CPC signals. The CPC signals may be received via the at least one CPC antenna 906 and the cognitive pilot channel receiver 902 and the received CPC signals may e.g. be demodulated and parsed to extract the context information of the received CPC signals (in general, the received CPC signals may be decoded) by the cognitive pilot channel decoder 904. In other words, in various embodiments, the CPC decoder 904 may contain all base-band blocks related to the decoding of the physical dedicated CPC. By way of example, this includes the demodulation of the received narrow-band CPC signal, the extraction of the context-information, etc.

The radio communication device 900 may further include a further transceiver 908. Furthermore, a plurality of transmit/receive antennas 910 may be provided coupled to the further transceiver 908 and configured to receive radio signals in accordance with various settable radio communication technologies of various radio communication technology families. The parameters for transmitting/receiving signals via the plurality of transmit/receive antennas 910 and the further transceiver 908 as well as the radio communication protocols to be respectively used may be controlled by an also provided processor 912, e.g. a programmable processor such as e.g. a microprocessor, which may be implemented as an SDR processor 912. As shown in FIG. 9, the SDR processor 912 may additionally include a V-CPC decoder. The V-CPC, may be mapped onto any Radio Access Technology typically used for useful data exchange, such as Cellular Wide Area radio communication systems (e.g., 3GPP LTE, etc.), Metropolitan Area radio communication systems (e.g., WiMAX), Short Range radio communication systems (e.g., WiFi), etc. Thus, in various embodiments, it is assumed that the SDR processor 912 is performing the channel demodulation and decoding in any suitable manner at higher communication protocol layers than the physical layer and no additional base-band logic is required. The only V-CPC related task to be performed within the SDR processor 912 may be to find and extract V-CPC from the current received frame structure of the respective communication protocol layer.

Furthermore, optionally, the radio communication device 900 may further include a user interface 914, e.g. a graphical user interface module 914, configured to provide a user interface, e.g. a graphical user interface for a user of the radio communication device 900. The user interface 914 may include, but is not limited to a keyboard, a display, a touchscreen, a microphone, a loudspeaker, etc.

In various embodiments, one or more switches 916, 918 may be provided configured to (depending on its switching state) provide electrical power to the cognitive pilot channel receiver 902 or the further transceiver 908. Furthermore, the radio communication device 900 may further include a power supply 920, e.g. a battery, and a power control logic 922. The power supply 920 may be coupled between the e.g. two switches 916, 918 and the cognitive pilot channel receiver 902 and the further transceiver 908, respectively. The power control logic 922 is coupled to the e.g. two switches 916, 918 to control the switching thereof.

By way of example, as shown in FIG. 9, in case the first switch 916 (which is electrically coupled (e.g. by means of first energy lines 924) between the cognitive pilot channel receiver 902 and the power supply 920) is closed under control of the power control logic 922, the cognitive pilot channel receiver 902 is provided with electrical power from the power supply 920 and in case the first switch 916 is opened under control of the power control logic 922, the cognitive pilot channel receiver 902 is separated (isolated) from the power supply 920. In an embodiment, the first switch 916 may also be electrically coupled between the cognitive pilot channel decoder 904 and the power supply 920, so that also the cognitive pilot channel decoder 904 may be selectively provided with electrical power or isolated from the electrical power by the first switch 916.

Furthermore, in case the second switch 918 (which is electrically coupled (e.g. by means of second energy lines 926) between the further transceiver 908 and the power supply 920) is closed under control of the power control logic 922, the further transceiver 908 is provided with electrical power from the power supply 920 and in case the second switch 918 is opened under control of the power control logic 922, the further transceiver 908 is separated (isolated) from the power supply 920. In an embodiment, the second switch 918 may also be electrically coupled between the SDR processor 912 and the power supply 920, so that also the SDR processor 912 may be selectively provided with electrical power or isolated from the electrical power by the second switch 918. Furthermore, the second switch 918 may also be electrically coupled between the user interface 914 and the power supply 920, so that also the user interface 914 may be selectively provided with electrical power or isolated from the electrical power by the second switch 918.

In FIG. 9, there are also shown data connections 928 representing connections between respective components of the radio communication device 900 for data transfer. Arrows at a respective end of a data connection 928 represents the data flow direction that is provided for the data flow between the respectively connected components.

In operation, after having received and decoded a CPC signal, the radio communication device 900 (more precisely the power control logic 922) may selectively energize or de-energize one or more components of the radio communication device 900, thereby saving energy for the operation of the radio communication device 900. By way of example, during the operation of waiting for or receiving the CPC signals, the cognitive pilot channel receiver 902 and the cognitive pilot channel decoder 904 may be activated, and after having received and decoded the CPC signal, the SDR processor 912 and the further transceiver 908 may also be activated, and after having selected the radio communication technology to be used for receiving/transmitting data from then onwards, the SDR processor 912 and the further transceiver 908 may be configured (e.g. programmed using a corresponding executable program code implementing the radio communication protocol to be used) accordingly and, during the receiving/transmission of data/signals via the further transceiver 908 and the SDR processor 912, these components may still be energized and the cognitive pilot channel receiver 902 and the cognitive pilot channel decoder 904 may be de-activated. In an embodiment, the SDR processor 912 and the further transceiver 908 may be de-activated in the beginning of the receiving process.

Figure 10:
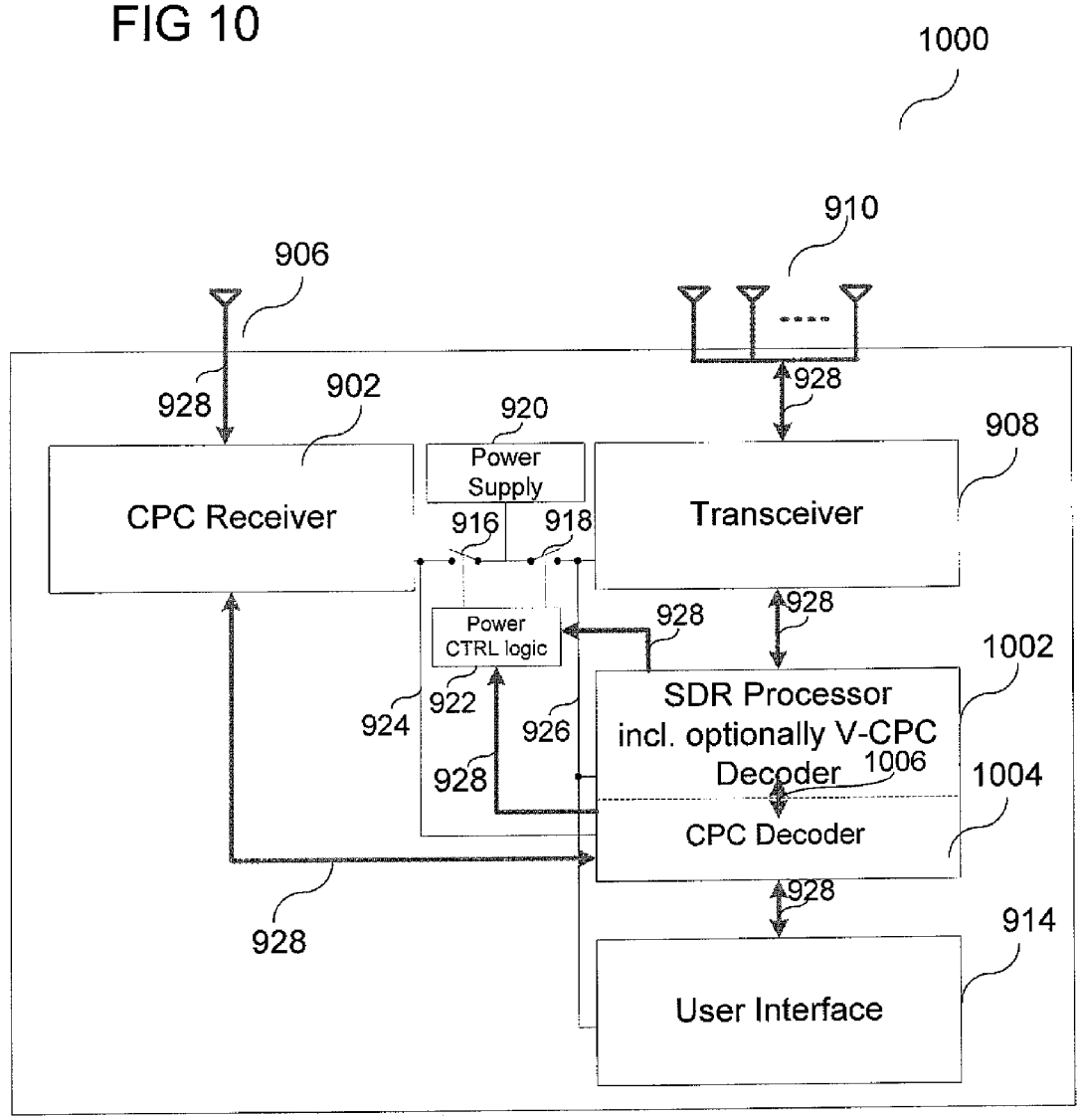
FIG. 10 shows a radio communication device in accordance with yet another embodiment.

FIG. 10 shows a radio communication device 1000 in accordance with yet another embodiment.

As shown in FIG. 10, the cognitive pilot channel decoder 1004 may be implemented as part of the SDR Processor 1002 (reference number 1006 refers to a process interface between the process implementing the cognitive pilot channel decoder 1004 and the remaining processes of the SDR Processor 1002). In this case, it is provided that power may be interrupted for parts of the SDR processor 1002, for example such that the cognitive pilot channel decoder 1004 can be active while the rest of the SDR processor 1002 is shut down and vice versa.

Since the cognitive pilot channel reception unit (e.g. the cognitive pilot channel receiver 902) is supposed to address a fixed and very narrow-band dedicated signal transmission at very low data rate, it is provided in various embodiments to implement a corresponding optimized circuit block. Alternatively, it would be possible to use the reconfigurable transceiver and SDR processor 1002—however, the rather small size of the CPC implementation and the very low power consumption of a corresponding block motivates the first choice. In various embodiments, it may be provided that the program code used to implement the CPC decoder 1004 is only loaded into the SDR processor 1002 as long as the CPC decoding is provided.

The rest of the radio communication device 1000 of FIG. 10 is similar to the radio communication device 900 of FIG. 9.

FIG. 11 shows a flow diagram 1100 illustrating a method for controlling a mobile radio communication device in accordance with an embodiment. In more detail, FIG. 11 shows a flow diagram 1100 illustrating a decision process in selecting an air interface and recovery of context information.

As shown in FIG. 11, in accordance with one embodiment of a data receiving process, in 1102, the mobile radio communication terminal device (such as the mobile radio communication terminal device 218, 220, (e.g. implemented as a User Equipment (UE))) switches on without any knowledge about any available air interfaces and associated Radio Access Technologies and protocols. In various embodiments, the power control logic (e.g. the power control logic 922) switches off e.g. the reconfigurable transceiver (e.g. the further transceiver 908), the SDR processor 912 and/or the user interface 914. The cognitive pilot channel receiver 902 (e.g. the cognitive pilot channel transceiver 902) and the cognitive pilot channel decoder 904 are switched on.

Next, in 1104, the cognitive pilot channel receiver 902 checks whether a CPC signal is available.

If the cognitive pilot channel receiver 902 determines that no CPC signal is available in 1104, in 1106, the power control logic 920 switches again on the reconfigurable (further) transceiver 908, the SDR processor 912 and the user interface 914 and a standard scanning process for scanning for available radio signals may be performed in 1108, thereby scanning a plurality of frequency bands to try to receive radio signals.

If the cognitive pilot channel receiver 902 determines in 1104 that a CPC signal is available, the power control logic 920 may switch on at least the SDR processor 912 and the cognitive pilot channel decoder 902 communicates the available radio communication systems (such as available cellular wide area radio communication systems, metropolitan area radio communication systems and/or short range radio communication systems) to the SDR processor 912. In an implementation, in 1110, the mobile radio communication terminal device (such as e.g. the UE) activates the dedicated physical cognitive pilot channel related receiver (such as e.g. the cognitive pilot channel receiver 902) and cognitive pilot channel decoder 904 building blocks. The building blocks related to the exchange of useful data (e.g. the SDR-processor 912 parts, the further transceiver 908, etc.) may be switched off.

Furthermore, in 1112, the mobile radio communication terminal device (such as e.g. the UE) may recover context information from the received dedicated physical cognitive pilot channel.

Then, in 1114, the mobile radio communication terminal device (such as e.g. the UE) may switch the SDR processor 912 and the related (further) transceiver 908 on and may transfer context information to the SDR processor 912.

Furthermore, in 1116, the power control logic 920 may switch off the cognitive pilot channel receiver 902 and the cognitive pilot channel decoder 904.

In an embodiment, in 1118 (which is the process being carried out after the process 1116 or after having completed process 1108), the SDR processor 912 chooses a preferred radio communication system among the available radio communication systems communicated by the cognitive pilot channel decoder 904. The choice may depend on constraints that are imposed by certain policies, e.g. policies of the service providers, policies of the user terminal or policies of user preferences. An additional optional scanning process may be started in order to identify potentially available radio communication systems that were not communicated by the cognitive pilot channel decoder 904. Once the SDR processor 912 has chosen a preferred radio communication system, the further transceiver 908 may be re-configured accordingly. By way of example, in 1118, the mobile radio communication terminal device (such as e.g. the UE) may select (among the available air interfaces, in other words, among the available radio communication technologies of the various radio communication families) the one which allows it to obtain e.g. the required minimum QoS (Quality of Service, i.e. the required minimum data rate, the required minimum latency, etc.) at e.g. a minimum cost (in terms of power consumption, price to pay for the communication, etc.).

Then, in 1120, the mobile radio communication terminal device (such as e.g. the UE) may exchange data via the selected air interface, in other words, in accordance with the selected radio communication technology of the selected radio communication technology family. By way of example, the data reception and/or data transmission may be performed using the preferred radio communication system.

If, e.g. in 1122, the SDR processor 912 finds out that a switch to a different radio communication standard (in other words, to a different radio communication technology of the same or of a different radio communication technology family) is required or an update of the context information is desirable, the radio communication system may choose to perform one of the following actions:

The SDR processor 912 may recover the (updated) context information from a V-CPC, i.e. a CPC that is transported via the air interface to which the mobile radio communication terminal device (such as e.g. the UE) is currently connected to. If the mobile radio communication terminal device (such as e.g. the UE) is connected to multiple air interfaces, the V-CPC may be transported on any one of the available links.

The SDR processor 912 reactivates the cognitive pilot channel receiver 902 and cognitive pilot channel decoder 904 in order to update the information on available radio communication systems via the dedicated physical cognitive pilot channel.

In an implementation, in case that it has been determined in 1122, that an update of context information is required, it is determined in 1124, as to whether a V-CPC is available. In case no V-CPC is available, the process continues in 1104, where it is determined as to whether a dedicated CPC is available. However, in case it has been determined in 1124 that a V-CPC is available, then, in 1126, the updated context information may be recovered based on the V-CPC that is contained in the current air-interface frame structure. Then, the process continues in 1118.

Furthermore, in an alternative embodiment, in a scenario where only the V-CPC is present (and no dedicated physical CPC), the only ways of obtaining context information may include the scanning of available air interfaces and the access to a V-CPC. In this context, the process steps related to the dedicated physical CPC indicated above may be omitted.

Various embodiments are related to the implementation of CPC related building blocks in a mobile radio communication terminal device (such as e.g. a UE) and the related operational processes, such as e.g.:

The implementation of CPC-related building blocks as described in the various embodiments described above with reference to FIG. 9, with the CPC decoder 904 being a stand-alone building block.

The implementation of CPC-related building blocks as described in the various embodiments described above with reference to FIG. 10, with the CPC decoder 1004 being integrated into the SDR processor 1002. SDR resources may be assigned to the CPC decoding on a per-need basis.

In various embodiments, a large number of mobile radio cells that are served by various air interfaces (such as cellular wide area radio communication systems, metropolitan radio communication systems and short range radio communication systems) are also covered by a dedicated physical pilot channel broadcasting context information. Such a scenario is illustrated in FIG. 1. Then, a user mobile radio communication terminal device based on the implementation architecture given e.g. in FIG. 9 (or alternatively, the one given in FIG. 10) accesses the respective radio communication system based on the following processes:

The mobile radio communication terminal device (such as e.g. the UE) activates the CPC related receiver (e.g. the cognitive pilot channel receiver 902) and decoder (e.g. the cognitive pilot channel decoder 904) blocks and recovers the context information. The SDR-related transceiver (e.g. the further transceiver 908) and the SDR processor 912 may be switched off in order to save power.

The mobile radio communication terminal device (such as e.g. the UE) may switch on the SDR processor 912 and the corresponding further transceiver 908 and may transfer the context information to the SDR processor 912.

The mobile radio communication terminal device (such as e.g. the UE) may switch off the CPC related receiver (e.g. the cognitive pilot channel receiver 902) and decoder (e.g. the cognitive pilot channel decoder 904) blocks.

Based on the context information, the mobile radio communication terminal device (such as e.g. the UE) may select one air interface among the available ones. In an embodiment, the mobile radio communication terminal device (such as e.g. the UE) may select the air interface that allows it to obtain the required minimum QoS (Quality of Service, i.e. the required minimum data rate, the required minimum latency, etc.) at a minimum cost (in terms of power consumption, price to pay for the communication, etc.). The mobile radio communication terminal device (such as e.g. the UE) may start communicating via the selected air interface.

If the mobile radio communication terminal device (such as e.g. the UE) decides to recover (updated) context information, it may connect to a V-CPC via the currently active air interface connection. If such a V-CPC is not available, the CPC-related receiver (e.g. the cognitive pilot channel receiver 902) and decoder (e.g. the cognitive pilot channel decoder 904) blocks may be switched on again in order to recover the context information and may be switched off again as soon as the information is available to the SDR processor 912. If possible, the SDR processor 912 and the related further transceiver 908 may be switched off during this process.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
a receiver to receive radio pilot information transmitted on a predefined physical channel, wherein the predefined physical channel is a cognitive pilot channel or a virtual cognitive pilot channel; and
a power supply switch controller, coupled with the receiver, to selectively energize and de-energize one or more components of the mobile radio communication device based on the radio pilot information.

2. The mobile radio communication device of claim 1, wherein the predefined physical channel is a cognitive pilot channel and the one or more components includes a CPC decoder and a software defined radio (SDR) processor separate from the CPC decoder.

3. The mobile radio communication device of claim 1, wherein the predefined physical channel is a virtual cognitive pilot channel.

4. The mobile radio communication device of claim 1, wherein:
the receiver is to receive the radio pilot information according to a radio communication technology family,
and the radio pilot information comprises availability information about the availability of at least one radio communication technology of at least one other radio communication technology family.

5. The mobile radio communication device of claim 1, further comprising a determination circuit configured to determine whether a predefined receiving criterion of the receiving of radio signals is fulfilled.

6. The mobile radio communication device of claim 5, wherein the predefined receiving criterion is a required minimum quality of service at a minimum cost.

7. The mobile radio communication device of claim 6, wherein the required minimum quality of service is a required minimum data rate.

8. The mobile radio communication device of claim 6, wherein the required minimum quality of service is a required minimum latency.

9. The mobile radio communication device of claim 6, wherein the minimum cost is determined by power consumption of the mobile radio communication device.

10. The mobile radio communication device of claim 6, wherein the minimum cost is determined by communication service costs.

11. A user equipment (UE) comprising:
a cognitive pilot channel (CPC) receiver to receive radio pilot information transmitted on a cognitive pilot channel;
a CPC decoder coupled with the CPC receiver;
a software defined radio (SDR) processor to implement a virtual-CPC decoder, the SDR processor separate from the CPC decoder;
a transceiver separate from the CPC receiver; and
power control logic to selectively energize one or more of a plurality of components of the UE based on the radio pilot information, the plurality of components to include the CPC receiver, the CPC decoder, the SDR processor, and the transceiver.

12. The UE of claim 11, wherein the power control logic is energize the transceiver based on a determination that a CPC signal is not available.

13. The UE of claim 11, wherein the power control logic is to energize the CPC decoder and the SDR processor based on a determination that a CPC signal is available.

14. The UE of claim 13, wherein the CPC decoder is to communicate an indication of available communication systems to the SDR processor.

15. The UE of claim 14, wherein the power control logic is to deenergize the CPC receive and CPC decoder after communicating the indication of available communication systems to the SDR processor.

16. The UE of claim 14, wherein the SDR processor is to select a communication system of the available communication systems and configure the transceiver to communicate via the communication system.

17. The UE of claim 16, wherein the communication system is a first communication system and the SDR processor is to obtain context information, to facilitate a switch to a second communication or to update information associated with the first communication system.

18. The UE of claim 17, wherein the power control logic is to reenergize the CPC receiver and the CPC decoder to obtain the context information.

19. The UE of claim 17, wherein the SDR processor is to implement a virtual CPC decoder to obtain the context information via the first communication system.

\* \* \* \* \*